`US007612785B2`

United States Patent
Ueda et al.

(10) Patent No.: US 7,612,785 B2
(45) Date of Patent: Nov. 3, 2009

(54) EDITING DEVICE, EDITING METHOD, EDITING PROGRAM AND COMPUTER-READABLE RECORDING MEDIUM WITH EDITING PROGRAM RECORDED THEREON

(75) Inventors: Hirotaka Ueda, Nara (JP); Mitsuru Minakuchi, Soraku-gun (JP); Kentaro Sakakura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 612 days.

(21) Appl. No.: 10/494,338

(22) PCT Filed: Sep. 9, 2002

(86) PCT No.: PCT/JP02/09177

§ 371 (c)(1),
(2), (4) Date: Apr. 30, 2004

(87) PCT Pub. No.: WO03/038758

PCT Pub. Date: May 8, 2003

(65) Prior Publication Data

US 2004/0260916 A1      Dec. 23, 2004

(30) Foreign Application Priority Data

Oct. 31, 2001      (JP)      ............................... 2001-334667

(51) Int. Cl.
*G09G 5/00* (2006.01)
*G06F 3/14* (2006.01)

(52) U.S. Cl. ........................ 345/619; 345/680; 715/864

(58) Field of Classification Search ................. 345/660, 345/661, 665–667, 672, 680–682, 684, 687, 345/688, 619, 670; 715/784, 864, 866, 830
See application file for complete search history.

(56) References Cited

U.S. PATENT DOCUMENTS

| | | | | |
|---|---|---|---|---|
| 5,396,590 | A  * | 3/1995 | Kreegar | ...................... 345/672 |
| 5,485,174 | A  * | 1/1996 | Henshaw et al. | ............ 345/684 |
| 5,568,603 | A  * | 10/1996 | Chen et al. | .................. 715/784 |
| 7,050,073 | B2 * | 5/2006 | Abler | ......................... 345/684 |
| 7,197,718 | B1 * | 3/2007 | Westerman et al. | ......... 345/660 |
| 2005/0024322 | A1 * | 2/2005 | Kupka | .......................... 345/156 |
| 2006/0284888 | A1 * | 12/2006 | Jetha et al. | .................. 345/620 |

FOREIGN PATENT DOCUMENTS

| | | |
|---|---|---|
| JP | 1-306916 A | 12/1989 |
| JP | 4-137074 A | 5/1992 |
| JP | 9-282480 A | 10/1997 |
| JP | 2000-331176 A | 11/2000 |

* cited by examiner

*Primary Examiner*—Chante Harrison
(74) *Attorney, Agent, or Firm*—Birch, Stewart, Kolasch & Birch, LLP

(57) ABSTRACT

An editing device includes a feature point detecting unit detecting a position of a feature point for specifying an operation target, a feature point projecting unit projecting into a display region the feature point positioned outside the display region, and a feature point displaying unit displaying the feature point at a position where it is projected. Therefore, even if the operation target is located outside the display region, the user can know the position of the operation target.

20 Claims, 14 Drawing Sheets

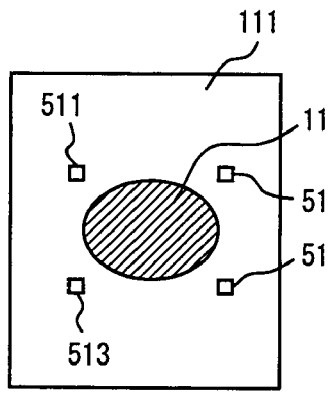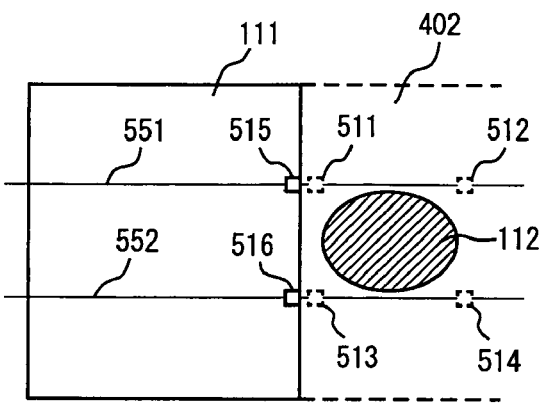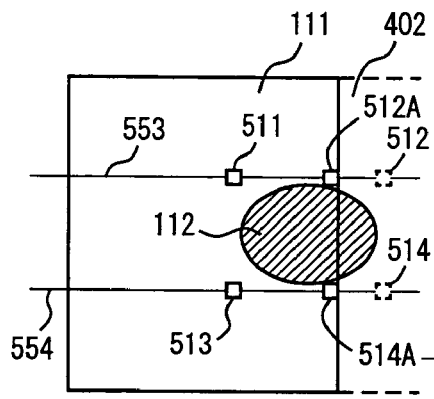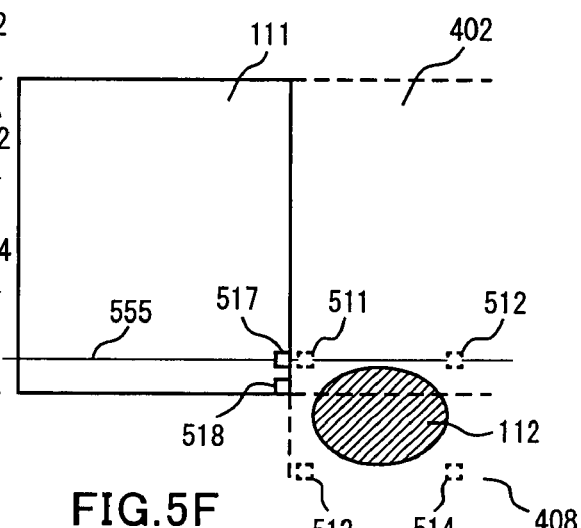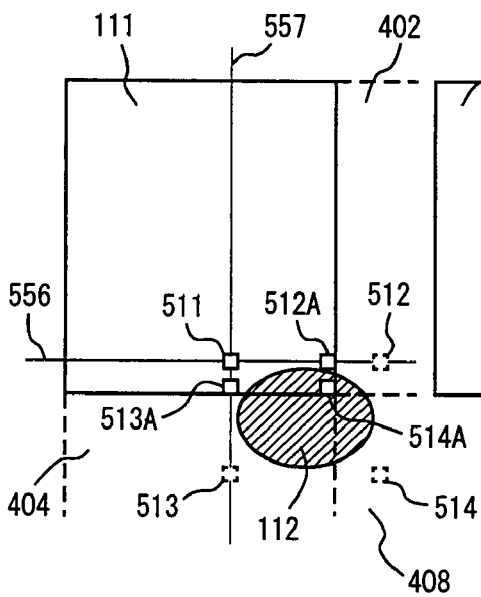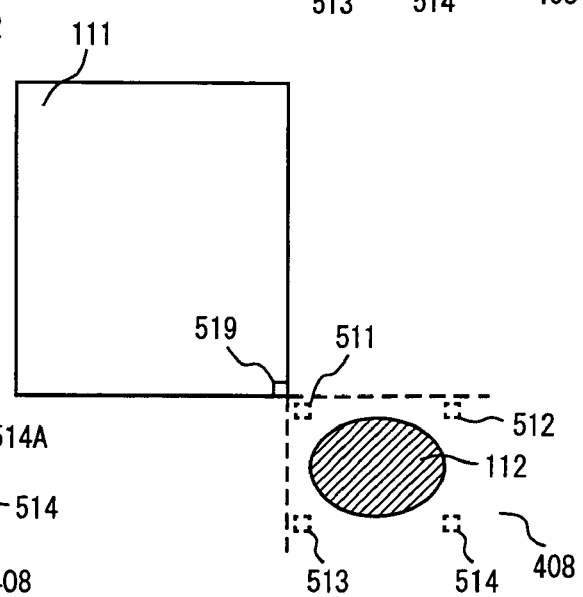

EDITING DEVICE, EDITING METHOD, EDITING PROGRAM AND COMPUTER-READABLE RECORDING MEDIUM WITH EDITING PROGRAM RECORDED THEREON

TECHNICAL FIELD

The present invention relates to an editing device, an editing method, an editing program, and a computer-readable recording medium with the editing program recorded thereon. More specifically, the present invention relates to an editing device, an editing method, an editing program, and a computer-readable recording medium with the editing program recorded thereon, suitable for editing graphics, texts, and the like.

BACKGROUND ART

Recently, personal computers or the like have been used to create multimedia content by combining content such as graphics, texts, photographs, sounds, and the like. In creating multimedia content, an operation of arranging and editing content on a canvas appearing in a display region is essential.

When the size of the canvas is larger than the size of the display region on the display, however, the content arranged on the canvas may not be displayed as a whole within the display region. In this case, the user displays the content to be edited in the display region by reducing the scale in the display region or by scrolling the display region. Japanese Patent Laying-Open No. 1-306916 discloses a technique of displaying desired content within a display region by automatically scrolling the display region.

Japanese Patent Laying-Open No. 1-306916 discloses a graphic input device that detects coordinates of an input graphic and draws a graphic on a display screen. The graphic input device includes determination means for determining whether an input position of coordinates is within a predetermined graphic input valid region, and scroll controlling means for scrolling the region to bring the input position into the region when the determination means determines that the input position is outside the region.

In this graphic input device, if, at the input of graphics or the like, the coordinates outside the predetermined graphic input valid region are designated, the screen is automatically scrolled. This eliminates the need for a cumbersome operation of suspending an operation of inputting graphics or the like during this operation to give an instruction of scrolling. Thus, the operability can be improved.

Meanwhile, small equipment such as a mobile phone has improved in processing ability so that multimedia content can be created by arranging content.

In the small equipment such as a mobile phone, since the size of the display region is often smaller than the canvas size, it frequently happens that the canvas does not fit into the display region. Therefore, the content as an operation target that the user wants to operate is often positioned outside the display region.

In order to avoid the situation described above, the entire canvas may be reduced in size to fit into the display region to be displayed. However, if it is displayed in a reduced size on the display screen of the small equipment, which is naturally small, the operation target arranged on the canvas becomes smaller and finer, which adversely deteriorates the operability for the user. In addition, the processing ability of the small equipment such as a mobile phone may not be sufficient, and thus the reducing operation may be difficult when the number of operation targets increases.

Moreover, in some applications, automatically scrolling the display region, as with the method disclosed in Japanese Patent Laying-Open No. 1-306916, is not necessarily appropriate.

For example, suppose that an animation product is created in which a ball appears from the left of the display region, moves across the display region, and then disappears at the right of the display region. In order to create it while grasping the range in which the final product can be viewed, the display region during the operation is desirably matched with the display region during a replay of the animation. In this case, it is uncertain in which direction the display region should be scrolled, since the operation target is located outside the display region.

DISCLOSURE OF THE INVENTION

A feature of the present invention is to provide an editing device, an editing method, an editing program, and a computer-readable recording medium with the editing program recorded thereon, capable of presenting a position of an operation target located outside a display region.

In order to achieve the aforementioned feature, in accordance with an aspect of the present invention, an editing device includes: a feature point detecting unit detecting a position of a feature point for specifying an operation target; a feature point projecting unit projecting the feature point positioned outside a display region to a position within the display region at a shortest distance from the feature point; and a feature point displaying unit displaying the feature point at a position where the feature point is projected by the feature point projecting unit.

In accordance with embodiments of the present invention, the editing device detects a position of a feature point for specifying an operation target, projects the feature point positioned outside a display region to a position within the display region at the shortest distance from the feature point, and displays the feature point at a position where the feature point is projected. Therefore, even if the operation target is located outside the display region, the user can know the position of the operation target. As a result, it is possible to provide an editing device capable of presenting a position of an operation target located outside the display region. In addition, it is possible to present to the user in which direction the operation target is located with respect to the display region.

In accordance with another aspect of the present invention, an editing device includes: a storage unit storing data for displaying an operation target; a display unit displaying an operation target stored by the storage unit and a feature point for specifying the operation target; feature point detecting means detecting a position of the feature point of the operation target indicated by data stored by the storage unit; feature point projecting means projecting, among the feature points of the operation target stored by the storage unit, the feature point positioned outside a display region to a position within the display region at a shortest distance from the feature point; and feature point displaying means displaying the feature point at a position of the display unit corresponding to the position where the feature point is projected by the feature point projecting means.

In accordance with embodiments of the present invention, the editing device detects a position of a feature point of an operation target, projects a feature point positioned outside the display region, among the feature points of the operation target, to a position within the display region at the shortest distance from the feature point, and displays the feature point at a position of the display unit corresponding to the position where the feature point is projected. Therefore, even if the operation target is located outside the display region, the user can know the position of the operation target. As a result, it is possible to provide an editing device capable of presenting a position of an operation target located outside the display region. In addition, it is possible to present to the user in which direction the operation target is located with respect to the display region.

Preferably, the position of the display unit corresponding to the position where the feature point is projected is a position including a position where a rectangle indicative of a feature point is projected.

Preferably, the feature point displaying means displays a plurality of feature points in such a manner that they are not overlapped with each other, when the plurality of feature points projected by the feature point projecting means are overlapped with each other in position. In accordance with the present invention, when a plurality of projected feature points are overlapped with each other in position, a plurality of feature points are displayed in such a manner that they are not overlapped with each other.

Preferably, the feature point projecting unit projects the feature point positioned outside the display region to a position within the display region at a shortest distance.

In accordance with the present invention, it is possible to present to the user in which direction an operation target is located with respect to the display region.

Preferably, the feature point is positioned at a center of the operation target.

In accordance with embodiments of the present invention, the operation target is specified with one feature point, for example, a point in the vicinity of the barycenter of the operation target. Therefore, the operation target may not be specified with a plurality of feature points, so that confusion in the display region can be eliminated and operability can be improved.

Preferably, the feature point is positioned at each vertex of a polygon surrounding the operation target.

In accordance with embodiments of the present invention, the feature point is arranged at each vertex of the polygon surrounding the operation target, for example, the circumscribed rectangle around the operation target, so that the feature point can be displayed in a manner that can be easily recognized by the user.

Preferably, further included are: an operation obtaining unit obtaining an operation on the feature point; and an operation executing unit operating the operation target according to the obtained operation.

In accordance with embodiments of the present invention, since the feature point of the operation target is displayed within the display region, the user can operate the operation target even if the operation target is located outside the display region.

Preferably, the feature point has a first feature point to be used to input an instruction of a first operation on the operation target, and a second feature point to be used to input an instruction of a second operation on the operation target, and the feature point displaying unit displays the first feature point and the second feature point in manners of display different from each other.

In accordance with embodiments of the present invention, it is possible to present to the user what operation can be performed on the operation target.

Preferably, the feature point displaying unit displays the feature point in a manner of display that is varied according to a distance between the feature point and the display region.

In accordance with embodiments of the present invention, it is possible to present to the user how far the operation target is from the display region.

Preferably, the feature point displaying unit displays the feature point in a manner of display that is varied according to an attribute of the operation target.

In accordance with embodiments of the present invention, the attribute of the operation target can be presented to the user. The attribute of the operation target includes, a position, a shape, a drawing color, a size, a line width, overlapping order, an identification number, a data size, and the like of a graphic, if the operation target is graphic. It includes a position, content, the number of characters, a font type, text decoration, a drawing color, a size, overlapping order, an identification number, a data size, and the like of a text, if the operation target is a text. The attribute of the operation target is presented to the user, for example, in such a manner that the drawing color of the feature point of the operation target is the same as the drawing color of the operation target.

In accordance with another aspect of the present invention, an editing method causes a computer including a storage unit storing data for displaying an operation target, a display unit displaying an operation target stored by the storage unit and a feature point for specifying the operation target, and a control unit allowing the display unit to display the operation target based on data stored by the storage unit, to execute the steps of: the control unit detecting a position of the feature point of the operation target indicated by the data stored by the storage unit; the control unit projecting, among the feature points of the operation target stored by the storage unit, the feature point positioned outside a display region to a position within the display region at a shortest distance from the feature point; and the control unit displaying the feature point at a position of the display unit corresponding to the position where the feature point is projected.

In accordance with embodiments of the present invention, the feature point positioned outside the display region is displayed at a position of the display unit corresponding to the position within the display region at the shortest distance from the feature point. Therefore, the user can know the position of the operation target even if the operation target is located outside the display region. As a result, it is possible to provide an editing method capable of presenting a position of an operation target located outside the display region in such a manner that can be easily recognized by the user. In addition, it is possible to present to the user in which direction the operation target is located with respect to the display region.

In accordance with a further aspect of the present invention, an editing program a computer including a storage unit storing data for displaying an operation target, a display unit displaying an operation target stored by the storage unit and a feature point for specifying the operation target, and a control unit allowing the display unit to display the operation target based on data stored by the storage unit, to execute the steps of: detecting a position of the feature point of the operation target indicated by the data stored by the storage unit; projecting, among the feature points of the operation target stored by the storage unit, the feature point positioned outside a display region to a position within the display region at a shortest distance from the feature point; and displaying the feature point at a position of the display unit corresponding to the position where the feature point is projected.

In accordance with embodiments of the present invention, the feature point positioned outside the display region is displayed at a position of the display unit corresponding to the position within the display region at the shortest distance from the feature point. Therefore, the user can know the position of the operation target even if the operation target is located outside the display region. As a result, it is possible to provide an editing program executed on a computer to allow the position of the operation target located outside the display region to be presented to the user in such a manner that can be easily recognized, as well as a computer-readable recording medium with the editing program recorded thereon. In addition, it is possible to present to the user in which direction the operation target is located with respect to the display region.

BRIEF DESCRIPTION OF THE DRAWINGS

FIGS. 5A-5F are first views showing an example in which the editing device in the embodiment displays a graphic and a feature point.

DETAILED DESCRIPTION

Figure 1:
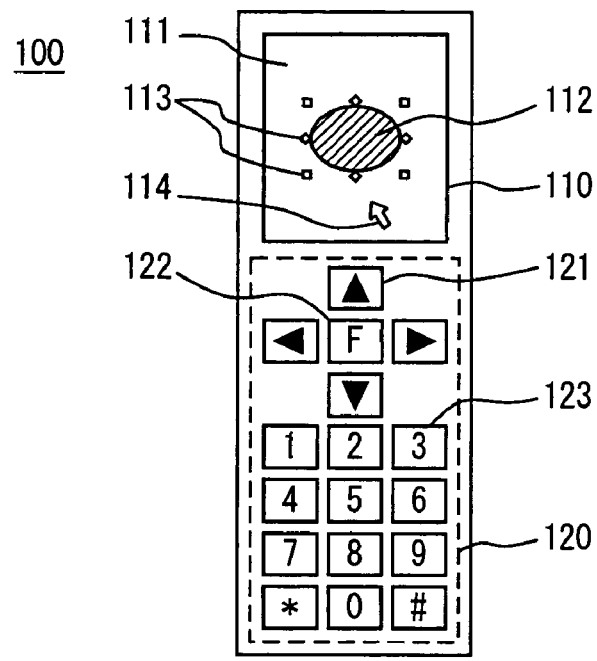
FIG. 1 is a plan view of an editing device in one embodiment of the present invention.

In the following, an embodiment of the present invention will be described with reference to the figures. It is noted that the same or corresponding parts will be denoted with the same reference characters in the figures and the same description will not be repeated.

FIG. 1 is a plan view of an editing device 100 in an embodiment of the present invention. Editing device 100 is formed of a portable information terminal such as a mobile phone. Editing device 100 generally includes a display unit 110 and an input unit 120.

Display unit 110 is a display such as a liquid crystal display. Input unit 120 includes a direction key 121 for moving a pointer 114 displayed on display unit 110, a decide key 122 for deciding an editing operation, and a dial key 123.

Direction key 121 includes an upward direction key for moving pointer 114 upward, a downward direction key for moving pointer 114 downward, a rightward direction key for moving pointer 114 rightward, and a leftward direction key for moving pointer 114 leftward.

Dial key 123 includes twelve buttons. When editing device 100 is applied as a communication terminal, the user can enter a number for specifying the other party to be communicated with, using dial key 123.

Display unit 110 displays content of a file to be edited by the user. The file includes a graphic 112 and a text. When the entire file to be edited cannot be displayed on display unit 110, a part of content of the file is displayed on display unit 110. Here, that region of content of a file which is displayed on display unit 110 is referred to as a display region.

Display unit 110 displays display region 111 of a file and also displays a feature point 113 and pointer 114. In FIG. 1, graphic 112 is included in display region 111.

Feature point 113 is a mark indicating that graphic 112 is selected as an operation target. Here, feature point 113 is represented as four squares arranged at vertexes of a rectangle circumscribed around graphic 112 and four rhombuses arranged at the midpoints of the four sides of the circumscribed rectangle. Feature point 113 is used by the user to enter an operation instruction for editing graphic 112 selected as an operation target. Editing includes changing the shape of the operation target, moving, copying or deleting the operation target, and the like.

In a method of selecting graphic 112 as an operation target, for example, the user uses direction key 121 to move pointer 114 onto graphic 112 and presses decide key 122. Graphic 112 is thereby selected. When graphic 112 is selected as an operation target, feature point 113 is displayed.

The position of pointer 114 is moved within display region 111 by direction key 121. Pointer 114 is used when graphic 112 is selected as an operation target and when an instruction for operating graphic 112 as the operation target is input.

Figure 2:
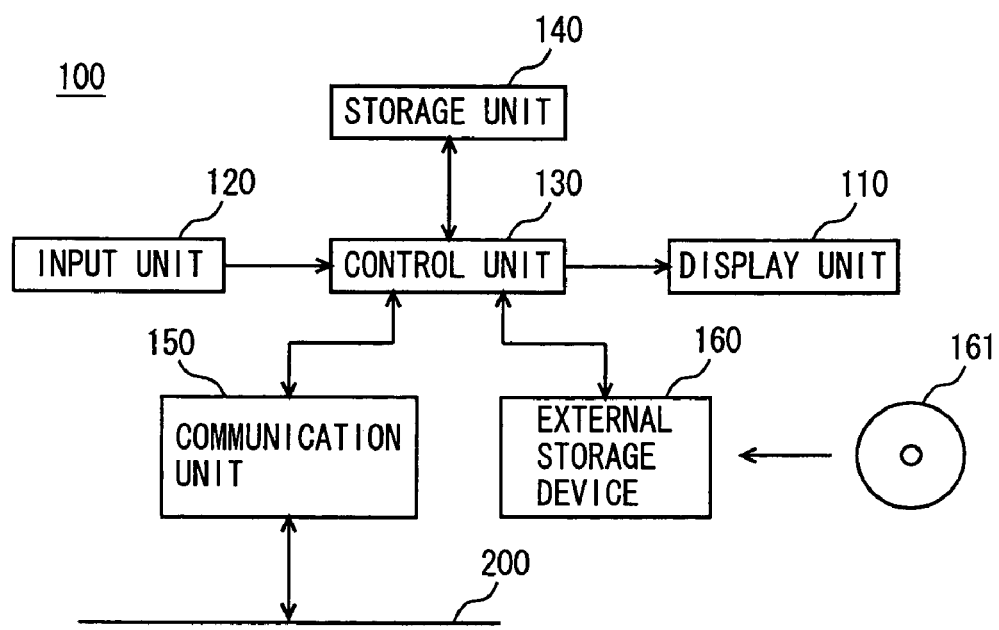
FIG. 2 is a block diagram schematically showing a configuration of the editing device in the embodiment of the present invention.

FIG. 2 is a block diagram schematically showing a configuration of editing device 100 in an embodiment of the present invention. Referring to FIG. 2, editing device 100 includes a control unit 130 for controlling editing device 100 on the whole, an input unit 120, a display unit 110, a storage unit 140, a communication unit 150 that is an interface for connecting editing device 100 with a network 200.

Control unit 130 includes a Central Processing Unit (CPU), a Read Only Memory (ROM) for storing a program executed on CPU, and a Random Access Memory (RAM) for use as a working area for storing variables and the like when a program is executed on CPU.

Input unit 120 includes direction key 121, decide key 122, and dial key 123. A signal input at input unit 120 is transmitted to control unit 130.

Display unit 110 is a liquid crystal display. On display unit 110, a graphic and a feature point positioned within display region 111, which are stored in storage unit 140, are displayed based on an instruction from control unit 130.

Storage unit 140 is a semiconductor memory such as a Random Access Memory (RAM). Storage unit 140 stores an attribute and the like of a graphic or a text. An attribute of a graphic includes a position, a shape, a drawing color, a size, a line width, overlapping order, an identification number, a data size, and the like of a graphic. An attribute of a text includes a position, a content, the number of characters, a font type, text decoration, a drawing color, a size, overlapping order, an identification number, a data-size, and the like of a text.

Editing device 100 can be connected to an external storage device 160. External storage device 160 reads a program or data recorded on a recording medium 161 and transmits the same to control unit 130. In control unit 130, the program read by external storage device 160 can be executed. In addition, based on an instruction from control unit 130, necessary information is written into recording medium 161.

In recording medium 161, an editing program can be recorded. In this case, the editing program recorded on recording medium 161 is read by external storage device 160 and executed by control unit 130.

Recording medium 161 may be a magnetic tape, a cassette tape, a floppy (R) disk, a hard disk, a CD-ROM, an MO, an MD, a DVD, an IC card (including a memory card), an optical card, or a medium that fixedly carries a program, including a semiconductor memory such as a mask ROM, an EPROM, an EEPROM, or a flash ROM. The content stored in recording medium 161 is not limited to a program and may be data.

Editing device 100 may be a medium carrying a program in flux in such a manner that the program is downloaded from network 200 including the Internet. When a program is downloaded from network 200 in this manner, a program for downloading may be stored in editing device 100 beforehand, or a program for downloading may be read from recording medium 161 for execution.

Figure 3:
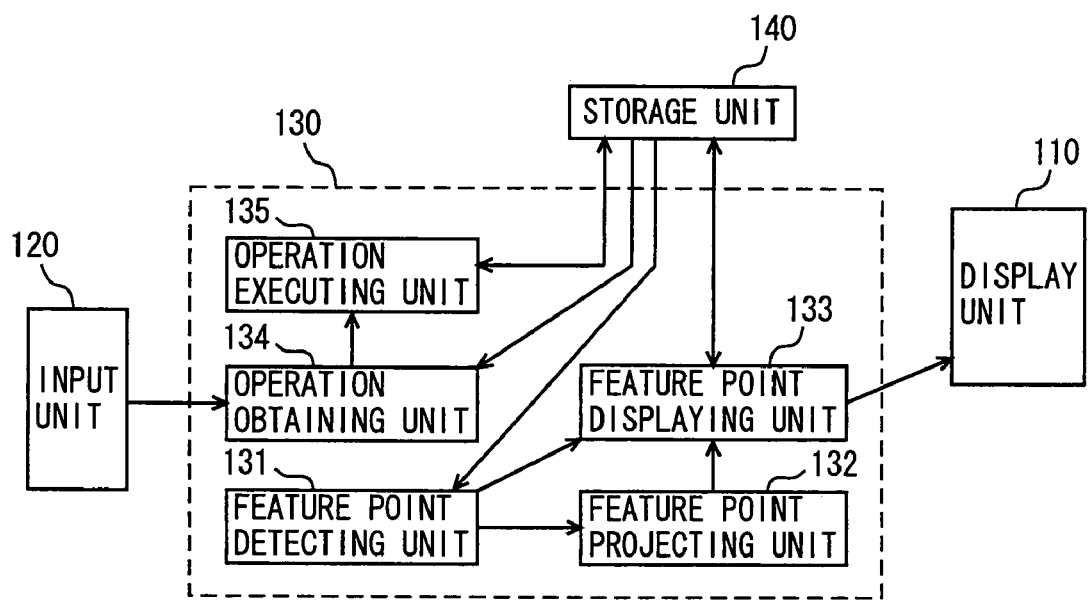
FIG. 3 is a functional block diagram schematically showing a function of a control unit of the editing device in the embodiment.

FIG. 3 is a functional block diagram schematically showing a function of control unit 130 of editing device 100 in the present embodiment. Referring to FIG. 3, control unit 130 includes a feature point detecting unit 131 detecting a position of a feature point for specifying an operation target, a feature point projecting unit 132 projecting into display region 111 a feature point positioned outside display region 111, a feature point displaying unit 133 displaying a feature point at a position where it is projected, an operation obtaining unit 134 obtaining an operation on a feature point, and an operation executing unit 135 operating an operation target in accordance with the obtained operation.

Feature point detecting unit 131 sends an attribute of a feature point to feature point displaying unit 133 when the feature point is positioned within display region 111. It sends an attribute of a feature point to feature point projecting unit 132 when the feature point is positioned outside display region 111. The attribute of the feature point includes information such as the position, shape, drawing color, size, line width, overlapping order, identification number, and the like of the feature point.

A feature point may be positioned at each vertex of a polygon surrounding a graphic as an operation target, for example, a circumscribed rectangle around the graphic. Alternatively, it may be positioned at a center of a graphic as an operation target, for example, in the vicinity of a barycenter of the graphic. Alternatively, it may be positioned at a midpoint of each side or the like of a polygon surrounding a graphic as an operation target, for example, a circumscribed rectangle around the graphic.

Feature point projecting unit 132 projects a feature point positioned outside display region 111 to a position at the shortest distance within display region 111. Feature point projecting unit 132 then adds to the attribute of the feature point the information of the position where the feature point has been projected, and sends the attribute of the feature point to feature point displaying unit 133. A method of projecting a feature point to a position at the shortest distance within display region 111 will be described later.

When the feature point detected by feature point detecting unit 131 is positioned within display region 111, feature point displaying unit 133 causes storage unit 140 to store the attribute of the feature point including the information of the position of the detected feature point and displays the feature point in a predetermined manner of display at the detected position on display unit 110.

When the feature point detected by feature point detecting unit 131 is outside display region 111, feature point displaying unit 133 causes storage unit 140 to store the attribute of the feature point including the information of the position of the feature point projected into display region 111 by feature point projecting unit 132 and displays the feature point in a predetermined manner of display at the position where it is projected on display unit 110.

The manner of display of a feature point is defined by the information such as a shape, a drawing color, a size, a line width, included in the attribute of the feature point. The manner of display of a feature point may be varied according to the kind of operation, or may be varied according to the distance between the feature point and display region 111, or may be varied according to the attribute of the operation target.

When a manner of display of a feature point is varied according to the kind of operation, for example, a feature point used when a graphic is enlarged or reduced upward/downward or leftward/rightward is represented by a rhombus, and a feature point used when a graphic is enlarged or reduced longitudinally and laterally to the same scale is represented by a square. When a manner of display of a feature point is varied according to the distance between a feature point and display region 111, the feature point is displayed with the length or color of the feature point varied according to the distance between the feature point and display region 111. When a manner of display of a feature point is varied according to an attribute of an operation target, a feature point is displayed in the same color as the color of the operation target.

Operation obtaining unit 134 obtains an operation input from input unit 120 for a feature point of an operation target. The obtained operation is then sent to operation executing unit 135.

Operation executing unit 135 operates a position, a shape, and the like of an operation target according to the operation of the feature point obtained by operation obtaining unit 134.

FIGS. 4A-4D illustrate a projection process executed in feature point projecting unit 132 of control unit 130 of editing device 100 in the present embodiment. The projection process is a process of projecting feature points 410-418 positioned outside display region 111 to a position at the shortest distance within display region 111.

Figure 4A:
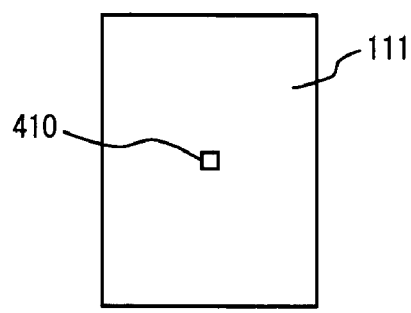
FIGS. 4A-4D illustrate a projection operation executed in a feature point projecting unit of the control unit of the editing device in the embodiment.

Referring to FIG. 4A, feature point 410 is positioned within display region 111. In this case, the projection process is not carried out, and feature point 410 is displayed at its position.

Figure 4B:
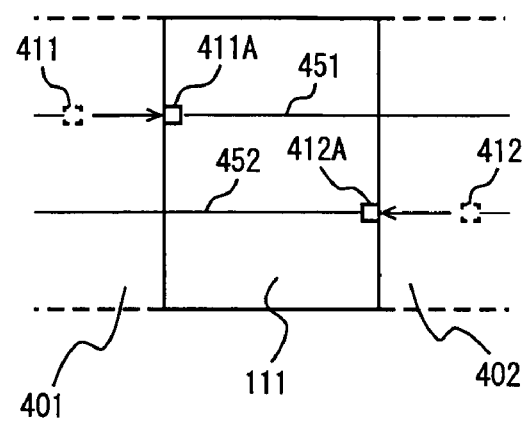

Referring to FIG. 4B, feature points 411, 412 are positioned in the left and right regions outside display region 111, that is, in regions 401, 402, respectively. In this case, feature points 411, 412 are respectively projected into display region 111 in the vicinity of points of intersection between horizontal lines 451, 452 passing through feature points 411, 412 and the outline of display region 111, which points are proximate to feature points 411, 412, and are then displayed as feature points 411A, 412A, respectively.

Figure 4C:
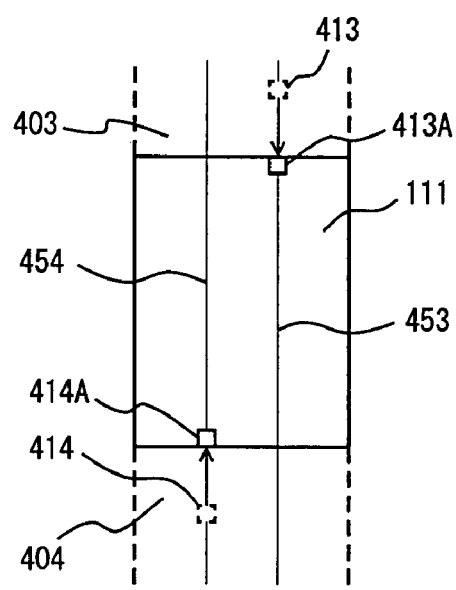

Referring to FIG. 4C, feature points 413, 414 are positioned in the upper and lower regions outside display region 111, that is, in regions 403, 404, respectively. In this case, feature points 413, 414 are respectively projected into display region 111 in the vicinity of points of intersection between vertical lines 453, 454 passing through feature points 413, 414 and the outline of display region 111, which points are proximate to feature points 413, 414, and are then displayed as feature points 413A, 414A, respectively.

Figure 4D:
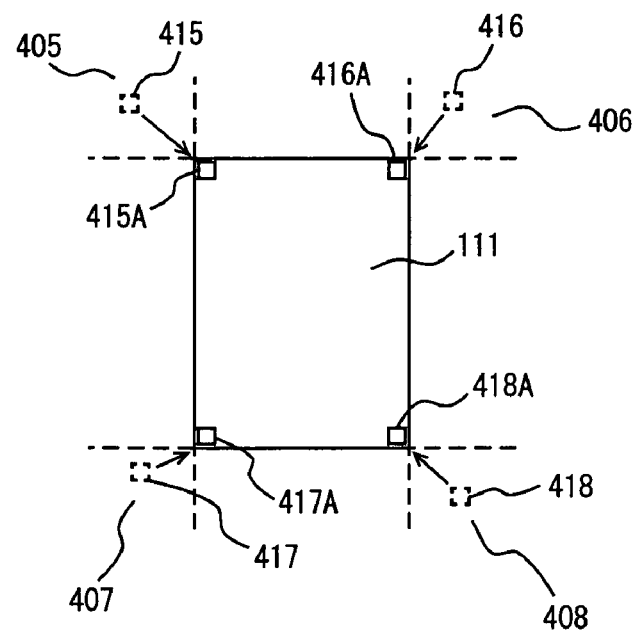

Referring to FIG. 4D, feature points 415, 416, 417, 418 are displayed in the diagonal regions outside display region 111, other than the left/right or upper/lower regions, that is, in regions 405, 406, 407, 408, respectively. In this case, feature points 415, 416, 417, 418 are respectively projected into display region 111 in the vicinity of vertexes of the outline of display region 111, which are proximate to feature points 415, 416, 417, 418, and are then displayed as feature points 415A, 416A, 417A, 418A, respectively.

FIGS. 5A-5F are first views showing an example in which editing device 100 in the present embodiment displays graphic 112 and feature points 511, 512, 513, 514. In FIGS. 5A-5F, feature points 511, 512, 513, 514 are each arranged at a vertex of a circumscribed rectangle around graphic 112.

Referring to FIG. 5A, graphic 112 and four feature points 511, 512, 513, 514 are displayed within display region 111. In this case, the projection process is not carried out, and feature points 511, 512, 513, 514 are displayed at their respective positions.

Referring to FIG. 5B, all of graphic 112 and four feature points 511, 512, 513, 514 are displayed in region 402 to the right side of display region 111. In this case, feature points 511, 512 are respectively projected into display region 111 in the vicinity of a point of intersection between a horizontal line 551 and the outline of display region 111, which point is proximate to feature points 511, 512. Since feature points 511, 512 are projected at the same position, they are overlapped and displayed as one feature point 515.

On the other hand, feature points 513, 514 are respectively projected into display region 111 in the vicinity of a point of intersection between a horizontal line 552 and the outline of display region 111, which point is proximate to feature point 513, 514. Since feature points 513, 514 are projected at the same position, they are overlapped and displayed as one feature point 516.

Referring to FIG. 5C, a part of graphic 112 and feature points 511, 513 are positioned within display region 111. In this case, the projection process is not carried out, and feature point 513 is displayed at its position.

On the other hand, the other part of graphic 112 and feature points 512, 514 are positioned in region 402 to the right side of the display region. In this case, feature points 512, 514 are respectively projected into display region 111 in the vicinity of points of intersection between horizontal lines 553, 554 and the outline of display region 111, which points are proximate to feature points 512, 514, and are then displayed as feature points 512A, 514A, respectively.

Referring to FIG. 5D, a part of graphic 112 and feature points 511, 512 are displayed in region 402 to the right side of display region 111. In this case, feature points 511, 512 are respectively projected into display region 111 in the vicinity of a point of intersection between a horizontal line 555 and the outline of display region 111, which point is proximate to feature points 511, 512. Since feature points 511, 512 are projected at the same position, they are overlapped and displayed as one feature point 517.

On the other hand, the other part of graphic 112 and feature points 513, 514 are positioned in region 408 to the lower right of display region 111. In this case, feature points 513, 514 are respectively projected into display region 111 in the vicinity of a vertex of the outline of display region 111, which is proximate to feature points 513, 514. Since feature points 513, 514 are projected at the same position, they are overlapped and displayed as one feature point 518.

Referring to FIG. 5E, a part of graphic 112 and feature point 511 are positioned within display region 111. In this case, the projection process is not carried out, and feature point 511 is displayed at its position.

On the other hand, another part of graphic 112 and feature point 512 are positioned in region 402 to the right side of display region 111. In this case, feature point 512 is projected into display region 111 in the vicinity of a point of intersection between a horizontal line 556 and the outline of display region 111, which is proximate to feature point 512, and is then displayed as a feature point 512A.

Furthermore, still another part of graphic 112 and feature point 513 are positioned in region 404 below display region 111. In this case, feature point 513 is projected into display region 111 in the vicinity of a point of intersection between a vertical line 557 passing through feature point 513 and the outline of display region 111, which point is proximate to feature point 513, and is then displayed as a feature point 513A.

The other part of graphic 112 and feature point 514 are positioned in region 408 to the lower right of display region 111. In this case, feature point 514 is projected into display region 111 in the vicinity of the vertex of the outline of display region 111, which is proximate to feature point 514, and is then displayed as a feature point 514A.

Referring to FIG. 5F, all of graphic 112 and four feature points 511, 512, 513, 514 are positioned in region 408 to the lower right of display region 111. In this case, feature points 511, 512, 513, 514 are respectively projected into display region 111 in the vicinity of the vertex of the outline of display region 111, which is proximate to feature points 511, 512, 513, 514. Since feature points 511, 512, 513, 514 are projected at the same position, they are overlapped and displayed as one feature point 519.

It is noted that although FIGS. 5B, 5D and 5F show that the projected feature points are displayed in an overlapped manner, by way of example, they may be displayed in a non-overlapped manner.

FIGS. 6A-6D are second views showing an example in which editing device 100 in the present embodiment displays graphic 112 and feature point 611. In FIGS. 6A-6D, feature point 611 is arranged at the barycenter of graphic 112.

Figure 6A:
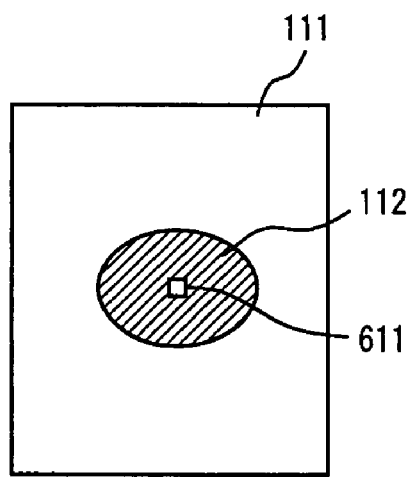
FIGS. 6A-6D are second views showing an example in which the editing device in the embodiment shows a graphic and a feature point.

Referring to FIG. 6A, graphic 112 and feature point 611 are positioned within display region 111. In this case, the projection process is not carried out, and feature point 611 is displayed at its position.

Figure 6B:
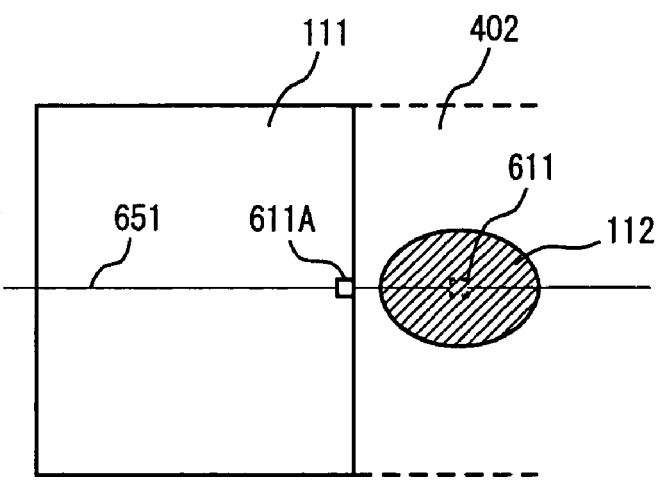

Referring to FIG. 6B, graphic 112 and feature point 611 are displayed in region 402 to the right side of display region 111. In this case, feature point 611 is projected into display region 111 in the vicinity of a point of intersection between a horizontal line 651 and the outline of display region 111, which point is proximate to feature point 611, and is then displayed as a feature point 611A.

Figure 6C:
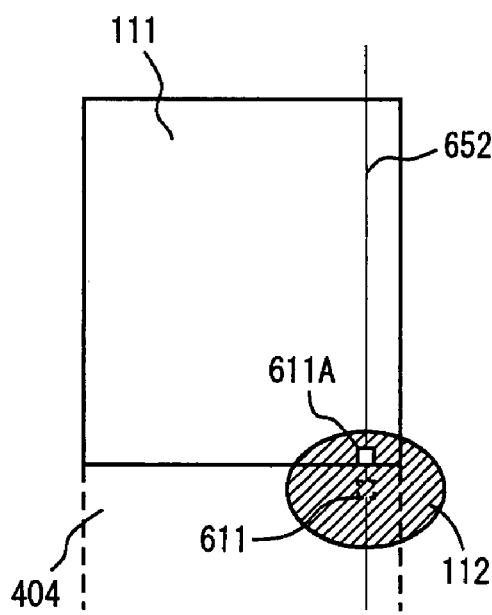

Referring to FIG. 6C, a part of graphic 112 and feature point 611 are positioned in region 404 below display region

111. In this case, feature point 611 is projected into display region 111 in the vicinity of a point of intersection between a vertical line 652 passing through feature point 611 and the outline of display region 111, which point is proximate to feature point 611, and is then displayed as a feature point 611A.

Figure 6D:
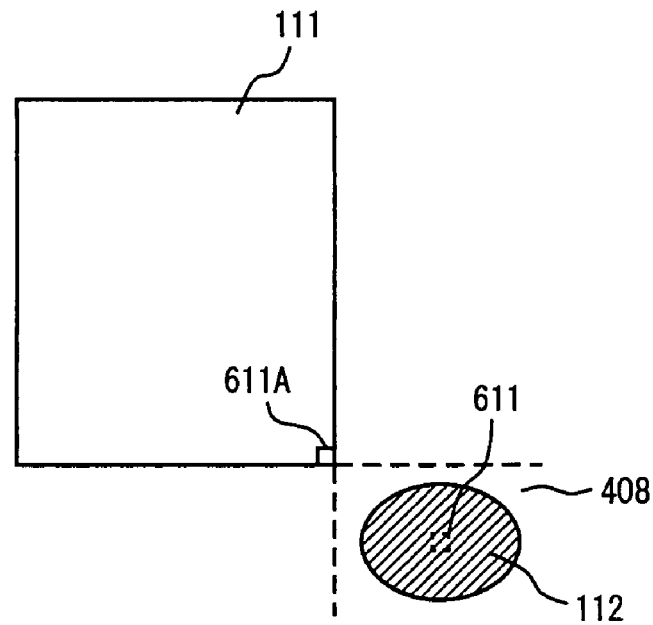

Referring to FIG. 6D, graphic 112 and feature point 611 are positioned in region 408 to the lower right of display region 111. In this case, feature point 611 is projected into display region 111 in the vicinity of the vertex of the outline of display region 111, which is proximate to feature point 611, and is then displayed as feature point 611A.

FIGS. 7A-7F are third views showing an example in which editing device 100 in the present embodiment displays graphic 112 and feature points 711-718. In FIGS. 7A-7F, feature points 711, 712, 713, 714 are each arranged at a vertex of a circumscribed rectangular of graphic 112. Feature points 715, 716, 717, 718 are each arranged at the midpoint of each side of graphic 112.

Figure 7A:
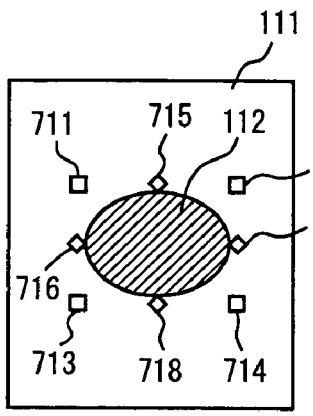
FIGS. 7A-7F are third views showing an example in which the editing device in the embodiment shows a graphic and a feature point.

Referring to FIG. 7A, graphic 112 and eight feature points 711-718 are positioned within display region 111. In this case, the projection process is not carried out, and feature points 711-718 are displayed at their respective positions.

Figure 7B:
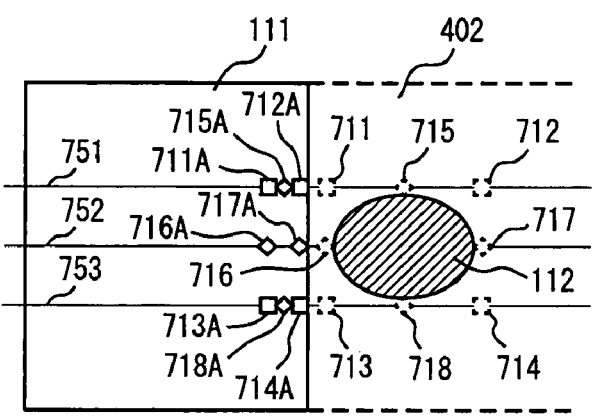

Referring to FIG. 7B, graphic 112 and eight feature points 711-718 are positioned in region 402 to the right side of display region 111. In this case, feature points 711, 712, 715 are respectively projected into display region 111 in the vicinity of a point of intersection between a horizontal line 751 and the outline of display region 111, which point is proximate to feature points 711, 712, 715, and are then displayed as feature points 711A, 712A, 715A, respectively, without overlapping with each other. Here, since feature point 715 is on a straight line connecting feature point 711 with feature point 712, feature point 715A is displayed on a straight line connecting feature point 711A with feature point 712A.

On the other hand, feature points 713, 714, 718 are respectively projected into display region 111 in the vicinity of a point of intersection between a horizontal line 753 and the outline of display region 111, which point is proximate to feature points 713, 714, 718, and are then displayed as feature points 713A, 714A, 718A, respectively, without overlapping with each other. Here, since feature point 718 is on a straight line connecting feature point 713 with feature point 714, feature point 718A is displayed on a straight line connecting feature point 713A with feature point 714A.

Furthermore, feature points 716, 717 are respectively projected into display region 111 in the vicinity of a point of intersection between a horizontal line 752 and the outline of display region 111, which point is proximate to feature points 716, 717, and are then displayed as feature points 716A, 717A, respectively, without overlapping with each other. Here, since feature point 716 is on a straight line connecting feature point 711 with feature point 713, feature point 716A is displayed on a straight line connecting feature point 711A with feature point 713A. Similarly, feature point 717A is displayed on a straight line connecting feature point 712A with feature point 714A.

Figure 7C:
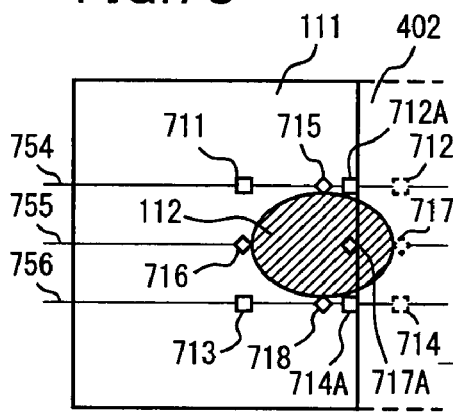

Referring to FIG. 7C, a part of graphic 112 and feature points 711, 713, 715, 716, 718 are positioned within display region 111. In this case, the projection process is not carried out, and feature points 711, 713, 715, 716, 718 are displayed at their respective positions.

Furthermore, the other part of graphic 112 and feature points 712, 714, 717 are positioned in region 402 to the right side of the display region. In this case, feature points 712, 714, 717 are respectively projected into display region 111 in the vicinity of points of intersection between horizontal lines 754, 755, 756 and the outline of display region 111, which points are proximate to feature points 712, 714, 717, and are then displayed as feature points 712A, 714A, 717A without overlapping with each other. Here, since feature point 717 is on a straight line connecting feature point 712 with feature point 714, feature point 717A is displayed on a straight line connecting feature point 712A with feature point 714A.

Figure 7D:
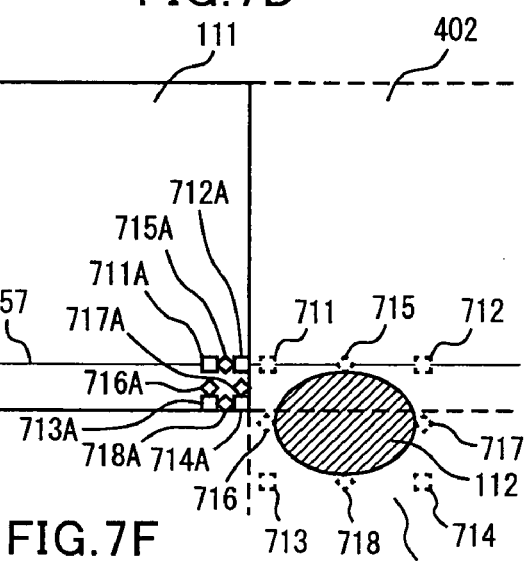

Referring to FIG. 7D, a part of feature point 112 and feature points 711, 712, 715 are positioned in region 402 to the right side of display region 111. In this case, feature points 711, 712, 715 are respectively projected into display region 111 in the vicinity of a point of intersection between a horizontal line 757 and the outline of display region 711, which point is proximate to feature points 711, 712, 715, and are then displayed as feature points 711A, 712A, 715A, respectively, without overlapping with each other. Here, since feature point 715 is on a straight line connecting feature point 711 with feature point 712, feature point 715A is displayed on a straight line connecting feature point 711A with feature point 712A.

Furthermore, the other part of graphic 112 and feature points 713, 714, 716, 717, 718 are positioned in region 408 to the lower right of display region 111. In this case, feature points 713, 714, 716, 717, 718 are projected into display region 111 in the vicinity of the vertex of the outline of display region 111, which is proximate to feature points 713, 714, 716, 717, 718, and are then displayed as feature points 713A, 714A, 716A, 717A, 718A, respectively, without overlapping with each other. Here, since feature point 716 is on a straight line connecting feature point 711 with feature point 713, feature point 716A is displayed on a straight line connecting feature point 711A with feature point 713A. Similarly, feature point 717A is displayed on a straight line connecting feature point 712A with feature point 714A, and feature point 718A is displayed on a straight line connecting feature point 713A with feature point 714A.

Figure 7E:
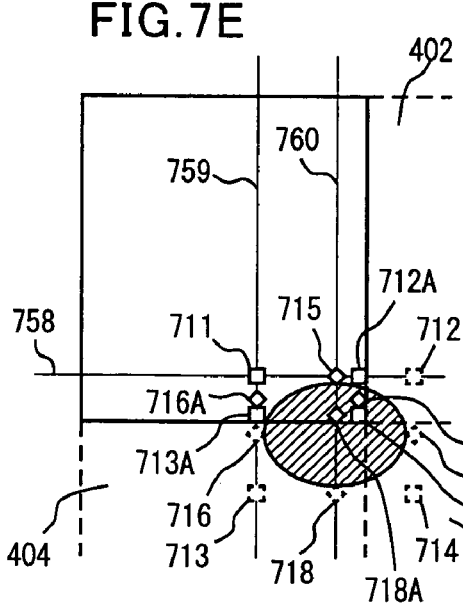

Referring to FIG. 7E, a part of graphic 112 and feature points 711, 715 are positioned within display region 111. In this case, the projection process is not carried out, and feature points 711, 715 are displayed at their respective positions.

Furthermore, another part of graphic 112 and feature point 712 are positioned in region 402 to the right side of display region 111. In this case, feature point 712 is projected into display region 111 in the vicinity of a point of intersection between a horizontal line 758 and the outline of display region 111, which point is proximate to feature point 712, and is then displayed as a feature point 712A.

Furthermore, yet another part of graphic 112 and feature points 714, 717 are positioned in region 408 to the lower right of display region 111. In this case, feature points 714, 717 are respectively projected into display region 111 in the vicinity of the vertex of the outline of display region 111, which is proximate to feature points 714, 717, and are then displayed as feature points 714A, 717A, respectively, without overlapping with each other. Here, since feature point 717 is on a straight line connecting feature point 712 with feature point 714, feature point 717A is displayed on a straight line connecting feature point 712A with feature point 714A.

Furthermore, the other part of graphic 112 and feature points 713, 716, 718 are positioned in region 404 below display region 111. In this case, feature points 713, 716, 718 are respectively projected into display region 111 in the vicinity of a point of intersection between a vertical line 759 passing through feature points 713, 716 and the outline of display region 111, which point is proximate to feature points 713, 716, and are then displayed as feature points 713A, 716A, respectively, without overlapping with each other.

Here, since feature point 716 is on a straight line connecting feature point 711 with feature point 713, feature point 716A is displayed on a straight line connecting feature point 711 with feature point 713A.

On the other hand, feature point 718 is projected into display region 111 in the vicinity of a point of intersection between a vertical line 760 passing through feature point 718 and the outline of display region 111, which point is proximate to feature point 718, and is then displayed as a feature point 718A. Here, since feature point 718 is on a straight line connecting feature point 713 with feature point 714, feature point 718A is displayed on a straight line connecting feature point 713A with feature point 714A.

Figure 7F:
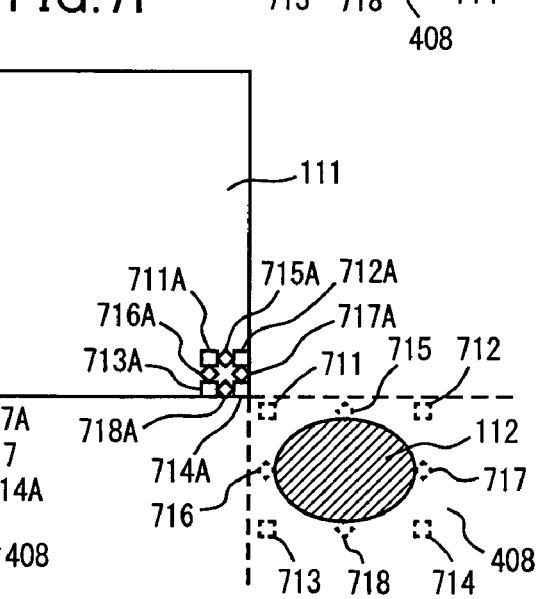

Referring to FIG. 7F, graphic 112 and eight feature points 711-718 are positioned in region 408 to the lower right of display region 111. In this case, feature points 711-718 are respectively projected into display region 111 in the vicinity of the vertex of the outline of display region 111, which is proximate to feature points 711-718, and are then displayed as feature points 711A-718A, respectively, without overlapping with each other. Here, since feature point 715 is on a straight line connecting feature point 711 with feature point 712, feature point 715A is displayed on a straight line connecting feature point 711A with feature point 712A. Similarly, feature point 716A is displayed on a straight line connecting feature point 711A with feature point 713A. Feature point 717A is displayed on a straight line connecting feature point 712A with feature point 714A. Feature point 718A is displayed on a straight line connecting feature point 713A with feature point 714A.

Figure 8:
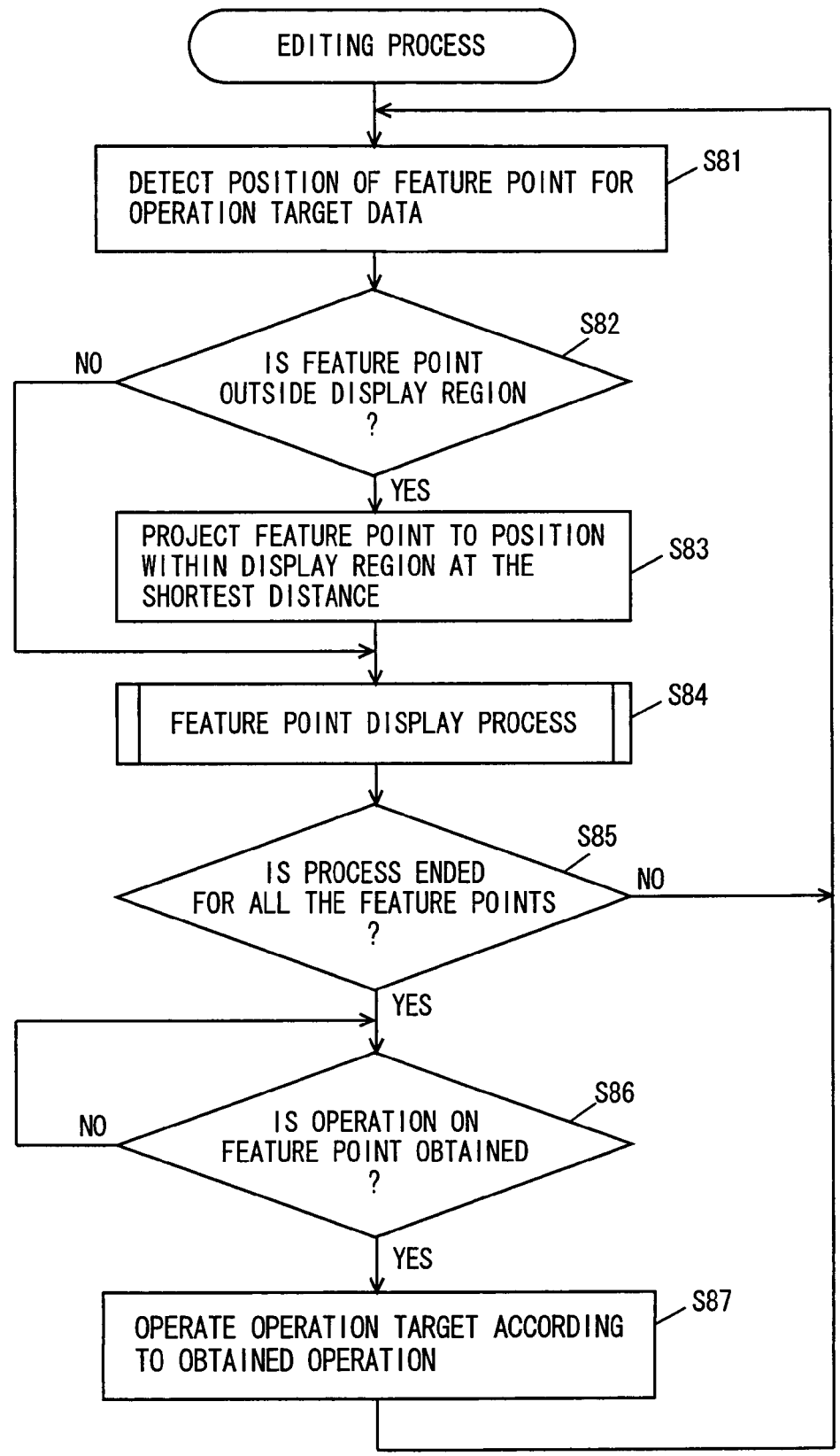
FIG. 8 is a flowchart showing a flow of an editing process executed in the editing device in the embodiment.

FIG. 8 is a flowchart showing a flow of an editing process executed in editing device 100 in the present embodiment. Referring to FIG. 8, in editing device 100, a position of a feature point for graphic 112 is detected from storage unit 140 by feature point detecting unit 131 (step S81).

Then, it is determined by feature point detecting unit 131 whether the feature point detected at step S81 is outside display region 111 (step S82). If the feature point is outside display region 111, the process proceeds to step S83, and if the feature point is not outside display region 111, the process proceeds to step S84.

If it is determined that the feature point is outside display region 111 at step S82, the feature point is projected by feature point projecting unit 132 to a position within display region 111 at the shortest distance from the feature point, and the point where it is projected is stored in storage unit 140 (step S83).

At step S84, a subroutine of a feature point display process is executed. The subroutine of the feature point display process will be described later.

After the feature point is displayed at step S84, it is determined whether the process is ended for all the feature points (step S85). If it is determined that the process is ended for all the feature points at step S85, the process will proceed to step S86. On the other hand, if it is determined that the process is not ended for all the feature points at step S85, the process returns to step S81, and the process is carried out for the other feature points for which process has not been ended.

At step S86, it is determined whether an operation on the feature point is obtained by operation obtaining unit 134. If an operation on the feature point is not obtained, step S86 is repeated, and if it is obtained, the process will proceed to step S87.

At step S87, operation executing unit 135 operates graphic 112 according to the obtained operation. Thereafter, the process returns to step S81, and an operation on a feature point for a changed graphic 112 is repeated.

Figure 9:
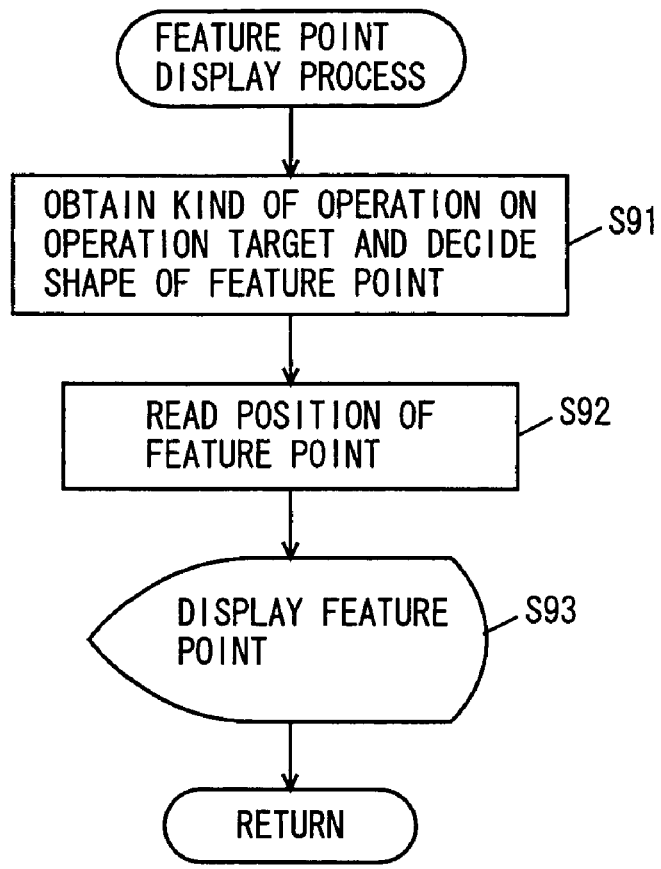
FIG. 9 is a first flowchart showing a flow of a feature point display process executed in a feature point displaying unit of the editing device in the embodiment.

FIG. 9 is a first flowchart showing a flow of a feature point display process executed in feature point displaying unit 133 of editing device 100 in the present embodiment. FIG. 9 shows a feature point display process where a manner of display of a feature point is varied depending on the kind of operation on an operation target.

Referring to FIG. 9, at step S91, a kind of operation executable on an operation target is obtained from storage unit 140 by feature point displaying unit 133. Then, a manner of display of a feature point is decided according to the kind of operation as obtained.

At the next step S92, a position of a feature point is read from storage unit 140. Here, if the feature point is outside display region 111, the position of the feature point to be read is a position where it is projected at step S83, and if the feature point is within display region 111, it is the position detected at step S83.

Then, at step S93, the feature point is displayed by feature point displaying unit 133 at the position read at step S92 in the manner of display as decided at step S91.

Displaying in the manner of display according to the kind of operation means displaying a first feature point used to input an instruction of a first operation on an operation target and a second feature point used to input an instruction of a second operation on the operation target, in manners of display different from each other.

For example, a feature point operated to allow graphic 112 to be enlarged or reduced longitudinally and laterally to the same scale is displayed in a square at each vertex of the circumscribed rectangle around graphic 112. A feature point operated to allow graphic 112 to be enlarged or reduced longitudinally or laterally is displayed in a rhombus.

Figure 10:
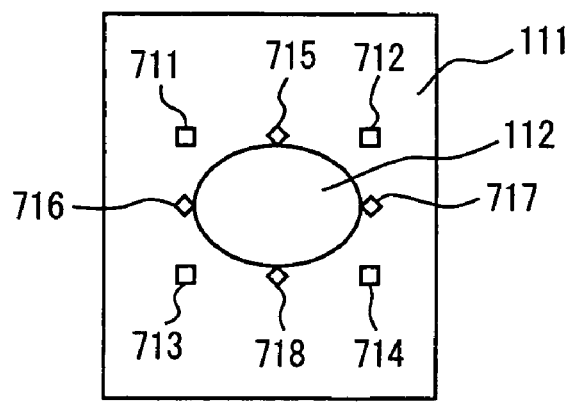
FIG. 10 is a first view showing an exemplary display image appearing on a display unit of the editing device in the embodiment.

FIG. 10 is a first view showing an exemplary display image appearing on display unit 102 of editing device 100 in the present embodiment.

Referring to FIG. 10, graphic 112, first feature points 711, 712, 713, 714, and second feature points 715, 716, 717, 718 are displayed in display region 111. First feature points 711, 712, 713, 714 differ from second feature points 715, 716, 717, 718 in the manner of display, where the first feature points are squares while the second feature points are displayed in rhombuses.

First feature points 711, 712, 713, 714 are used to input an instruction of a first operation on graphic 112. The first operation is, for example, an operation of enlarging or reducing graphic 112 in the lateral direction and in the longitudinal direction to the same scale.

Second feature points 715, 716, 717, 718 are used to input an instruction of a second operation on graphic 112. The second operation is, for example, an operation of enlarging or reducing graphic 112 longitudinally or laterally.

Figure 11:
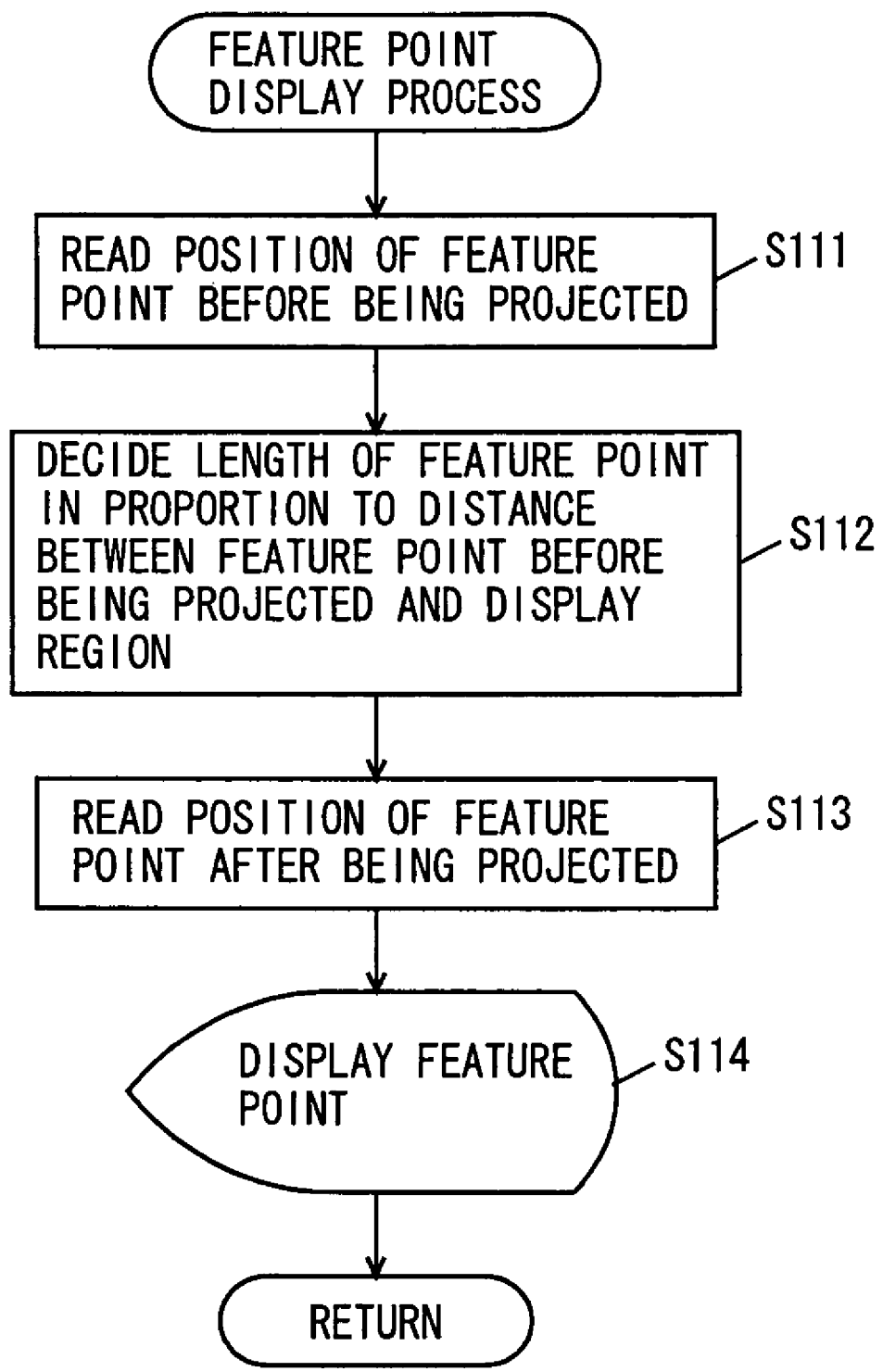
FIG. 11 is a second flowchart showing a flow of a feature point display process executed in the feature point displaying unit of the editing device in the embodiment.

FIG. 11 is a second flowchart showing a flow of a feature point display process executed in feature point displaying unit 133 of editing device 100 in the present embodiment. FIG. 11 shows a feature point display process where a manner of display of a feature point is varied according to a distance between a feature point and display region 111.

Referring to FIG. 11, at step S111, a position of a feature point before being projected at step S83 is read from storage unit 140. When the feature point is not projected, the position detected at step S81 is read.

Then, at step S112, the distance between the position of the feature point read at step S111 and display region 111 is calculated by feature point displaying unit 133. The shape of the feature point is then decided in a length according to the distance.

Then, at step S13, a position of a feature point after being projected at step S83 is read from storage unit 140. When the feature point is not projected, the position detected at step S81 is read.

Then, at step S114, the feature point is displayed by feature point displaying unit 133 in the manner of display as decided at step S112 at the position read at step S113.

Figure 12A:
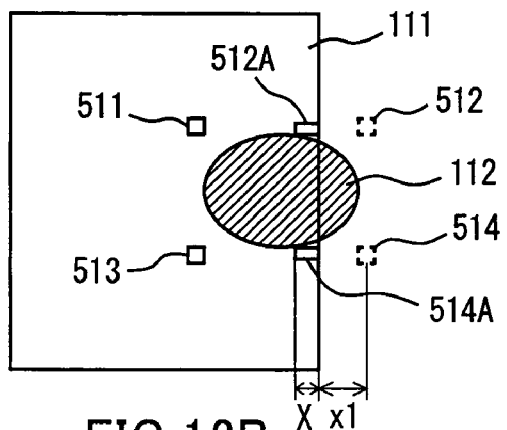
FIGS. 12A-12C are second views showing exemplary display images appearing on the display unit of the editing device in the embodiment.
Figure 12B:
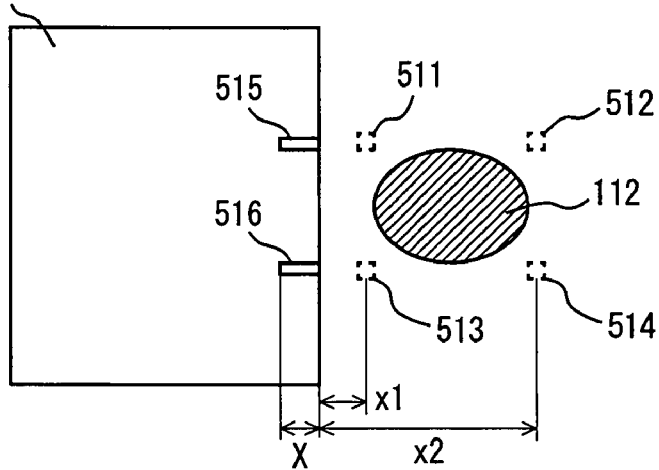
Figure 12C:
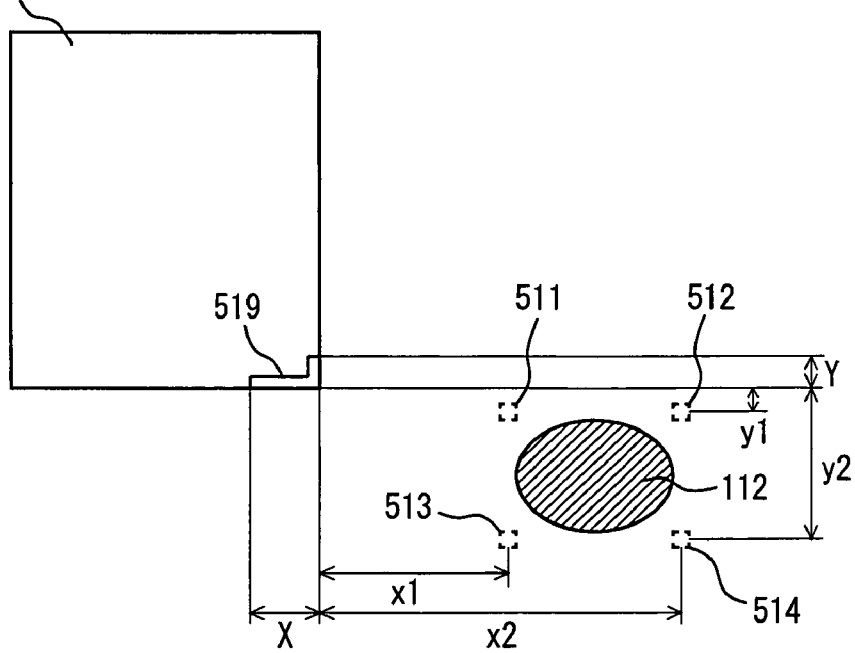

FIGS. 12A-12C are second views showing exemplary display images appearing on display unit 102 of editing device 100 in the present embodiment. FIGS. 12A-12C shows that the shapes of feature points 511, 512, 513, 514 are varied according to the distances between feature points 511, 512, 513, 514 and display region 111.

FIG. 12A shows that a part of graphic 112 is outside display region 111. Referring to FIG. 12A, a part of graphic 112 and feature points 511, 513 are positioned within display region 111. In the region to the right side of display region 111, the other part of graphic 112 and feature points 512, 514 are positioned. Feature points 512, 514 are projected to respective positions at the shortest distance therefrom within the display region and are displayed as feature points 512A, 514A, respectively.

For example, feature points 512A, 514A are each displayed in a length $X=k \times x1$, where k is a proportionality constant, and x1 is a distance between display region 111 and feature points 512, 514 positioned in the right region outside display region 111.

FIG. 12B shows that graphic 112 is in the region to the right side of display region 111. Referring to FIG. 12B, graphic 112 and feature points 511, 512, 513, 514 are positioned in the region to the right side of display region 111. Feature points 511, 512 are projected to a position within the display region at the shortest distance therefrom and are displayed while overlapping with each other as feature point 515. On the other hand, feature points 513, 514 are projected to a position within the display region at the shortest distance therefrom and are displayed while overlapping with each other as feature point 516.

For example, feature points 515, 516 are each displayed in a length $X=k \times (x1+x2)/2$, where k is a proportionality constant, x1 is the distance between two feature points 511, 513 positioned in the right region outside display region 111 and display region 111, and x2 is the distance between two feature points 512, 514 positioned in the right region outside display region 111 and display region 111.

FIG. 12C shows that graphic 112 is in the region to the lower right of display region 111. Referring to FIG. 12C, graphic 112 and feature points 511, 512, 513, 514 are positioned in the region to the lower right of display region 111. Feature points 511, 512, 513, 514 are projected to a position within the display region at the shortest distance therefrom and are displayed while overlapping with each other as feature point 519.

For example, feature point 519 is displayed in a horizontal length $X=k \times (x1+x2)/2$ and a vertical length $Y=k \times (y1+y2)/2$. Here, k is a proportionality constant. x1 is a horizontal distance between two feature points 511, 513 positioned in the lower right region outside display region 111 and display region 111. x2 is a horizontal distance between two feature points 511, 513 positioned in the lower right region outside display region 111 and display region 111. y1 is a vertical distance between two feature points 511, 512 positioned in the lower right region outside display region 111 and display region 111. y2 is a vertical distance between two feature points 513, 514 positioned in the lower right region outside display region 111 and display region 111.

As shown in FIGS. 12A, 12B and 12C, the horizontal length X and the vertical length Y of the projected feature points 512A, 514A, 515, 516 are changed according to distances x1, x2, y1 and y2 between feature points 511, 512, 513, 514 to be projected and display region 111.

Figure 13A:
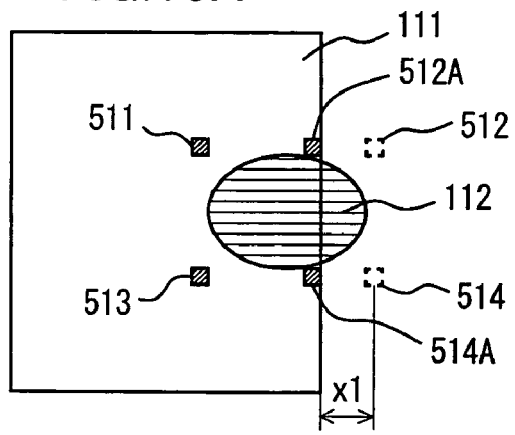
FIGS. 13A-13C are third views showing exemplary display images appearing on the display unit of the editing device in the embodiment.
Figure 13B:
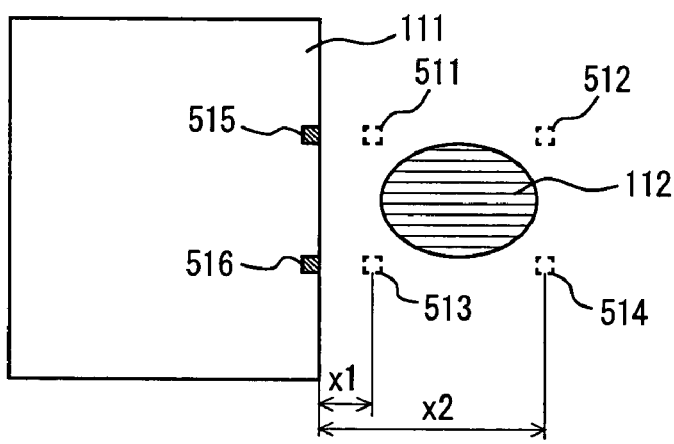
Figure 13C:
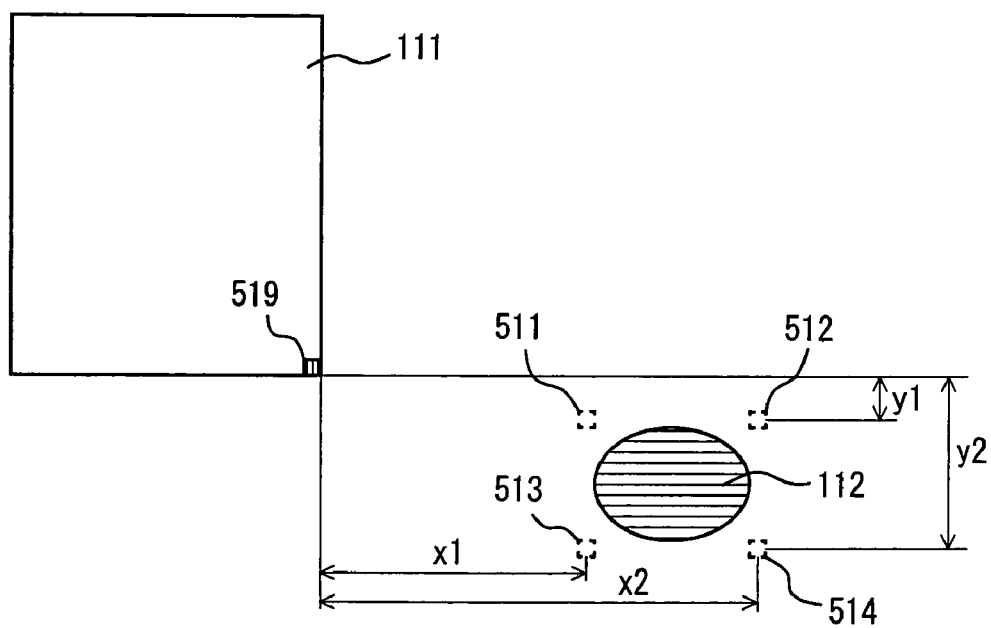

FIGS. 13A-13C are third views showing exemplary display images appearing on display unit 102 of editing device 100 in the present embodiment. FIGS. 13A-13C show that the lightness of the color of feature points 511, 512, 513, 514 is varied for display according to the distances between feature points 511, 512, 513, 514 and display region 111.

FIG. 13A shows that a part of graphic 112 is outside display region 111. Referring to FIG. 13A, a part of graphic 112 and feature points 511, 513 are positioned within display region 111. The other part of graphic 112 and feature points 512, 514 are positioned in the region to the right side of display region 111. Feature points 512, 514 are respectively projected to positions within the display region at the shortest distance therefrom, and are displayed as feature points 512A, 514A, respectively.

For example, the color of feature points 512A, 514A is respectively displayed at lightness $L=K \times x1$. Here, K is a proportionality constant. x1 is a distance between feature points 512, 514 positioned in the right region outside display region 111 and display region 111.

FIG. 13B shows that graphic 112 is in the region to the right side of display region 111. Referring to FIG. 13B, graphic 112 and feature points 511, 512, 513, 514 are positioned in the region to the right side of display region 111. Feature points 511, 512 are projected to a position within display region 111 at the shortest distance therefrom and are displayed while overlapping with each other as feature point 515. Feature points 513, 514 are projected to a position within the display region at the shortest distance therefrom and are displayed while overlapping with each other as feature point 516.

For example, the color of feature points 515, 516 is respectively displayed at lightness $L=K \times (x1+x2)/2$. Here, K is a proportionality constant. x1 is a distance between two feature points 511, 513 in the right region outside display region 111 and display region 111. x2 is a distance between two feature points 512, 514 positioned in the right region outside display region 111 and display region 111.

FIG. 13C shows that graphic 112 is in the region to the lower right of display region 111. Referring to FIG. 13C, graphic 112 and feature points 511, 512, 513, 514 are positioned in the region to the lower right of display region 111. Feature points 511, 512, 513, 514 are projected to a position within the display region at the shortest distance therefrom and are displayed while overlapping with each other as feature point 519.

For example, the color of feature point 519 is displayed at lightness $L=K \times ((x1+x2)^2+(y1+y2)^2)^{1/2}/2$. Here, K is a proportionality constant. x1 is a horizontal distance between two feature points 511, 513 positioned in the lower right region outside display region 111 and display region 111. x2 is a horizontal distance between two feature points 511, 513 positioned in the lower right region outside display region 111 and display region 111. y1 is a vertical distance between two feature points 511, 512 positioned in the lower right region outside display region 111 and display region 111. y2 is a vertical distance between two feature points 513, 514 positioned in the lower right region outside display region 111 and display region 111.

As shown in FIGS. 13A, 13B and 13C, lightness L of the color of the projected feature points 512A, 514A, 515, 516 is changed according to distances x1, x2, y1 and y2 between feature points 511, 512, 513, 514 to be projected and display region 111. It is noted that hue or chroma may be varied in place of lightness.

Figure 14:
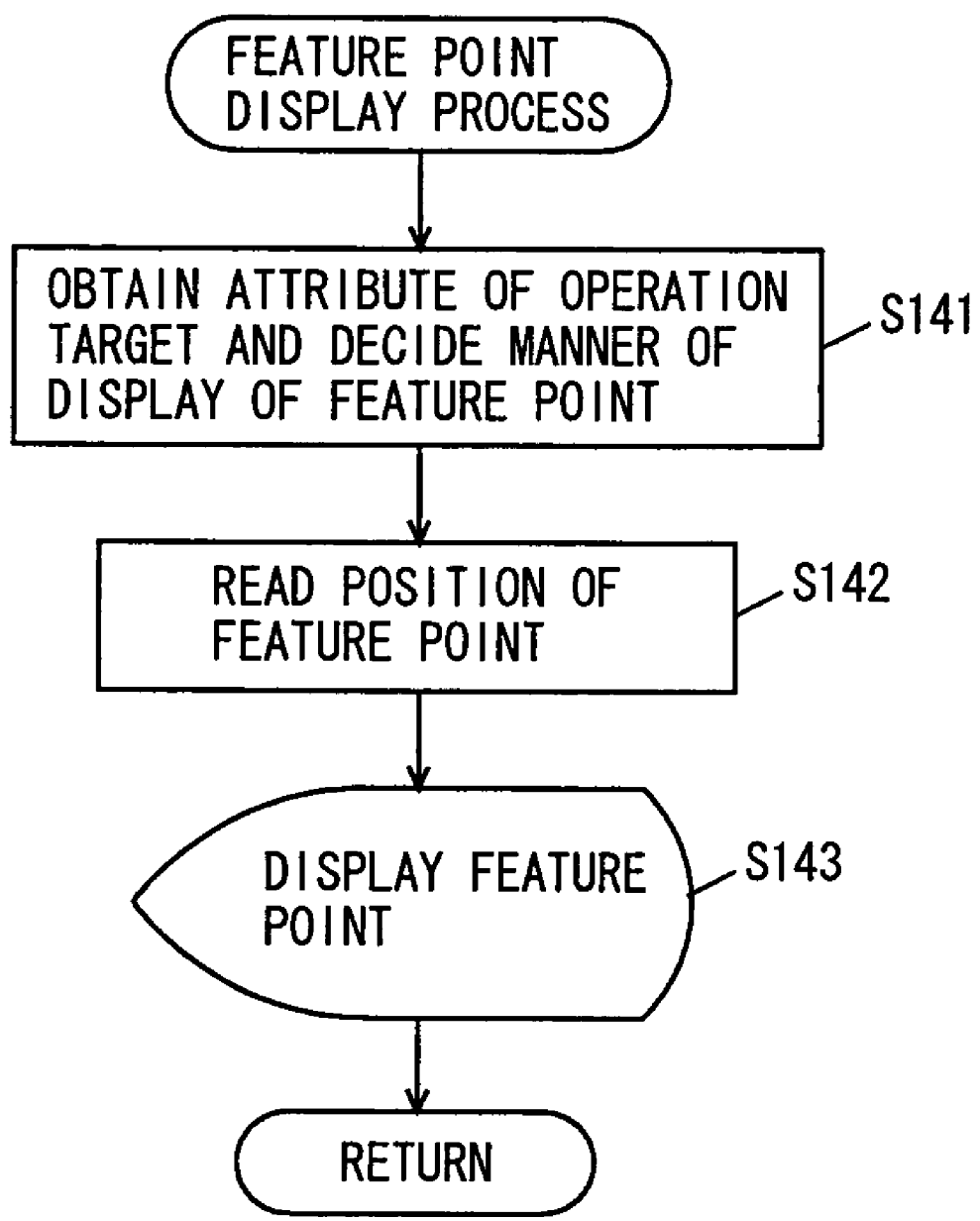
FIG. 14 is a third flowchart showing a flow of the feature point display process executed in the feature point displaying unit of the editing device in the embodiment.

FIG. 14 is a third flowchart showing a flow of a feature point display process executed in feature point displaying unit 133 of editing device 100 in the present embodiment. FIG. 14 shows a feature point display process where a manner of display of a feature point is varied according to the attribute of graphic 112.

Referring to FIG. 14, at step S141, the attribute of graphic 112 is obtained from storage unit 140 by feature point displaying unit 133. Then, a manner of display of a feature point is decided according to the obtained attribute of graphic 112. Here, the obtained attribute of graphic 112 is assumed to be the color of graphic 112. In this case, the color of the feature point is decided as the same color as graphic 112.

Then, at step S142, the position of the feature point is read from storage unit 140. Here, if the feature point is outside display region 111, the read position of the feature point is the position where it is projected at step S83, and if the feature point is within display region 111, it is the position detected at step S81.

Then, at step S143, the feature point is displayed by feature point displaying unit 133 in the manner of display as decided at step S141 at the position read at step S142. Here, the feature point is displayed in the color decided at step S141.

FIGS. 15A-15F are fourth views showing exemplary display images appearing on display unit 102 of editing device 100 in the present embodiment. FIGS. 15A-15F show that the colors of feature points 511, 512, 513, 514 are varied according to the color of the attribute of graphic 112.

Figure 15A:
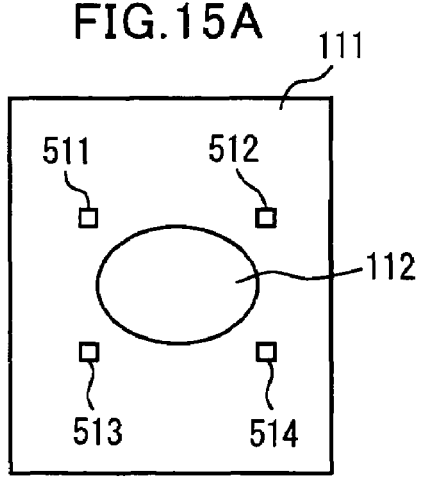
FIGS. 15A-15F are fourth views showing exemplary display images appearing on the display unit of the editing device in the embodiment.
Figure 15B:
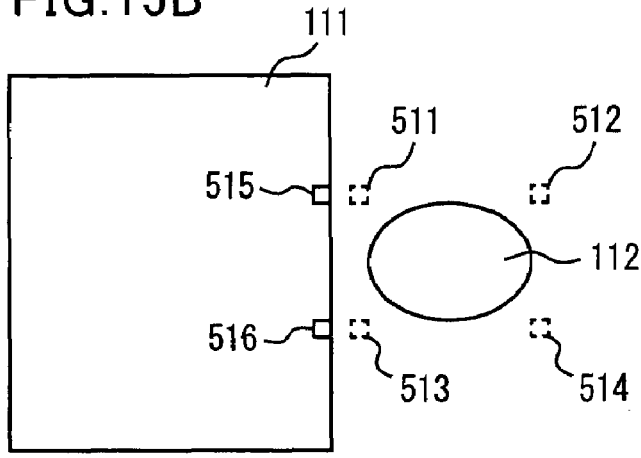

FIGS. 15A and 15B show that the color of graphic 112 is yellow. Referring to FIGS. 15A and 15B, feature points 511-516 are displayed in yellow as the color of graphic 112 is yellow.

Figure 15C:
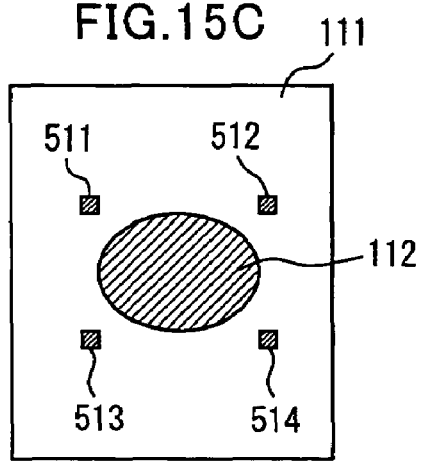
Figure 15D:
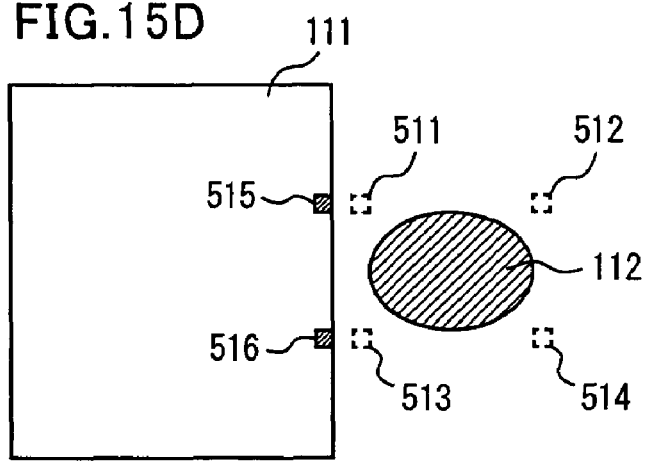

FIGS. 15C and 15D show that the color of graphic 112 is blue. Referring to FIGS. 15C and 15D, feature points 511-516 are displayed in blue as the color of graphic 112 is blue.

Figure 15E:
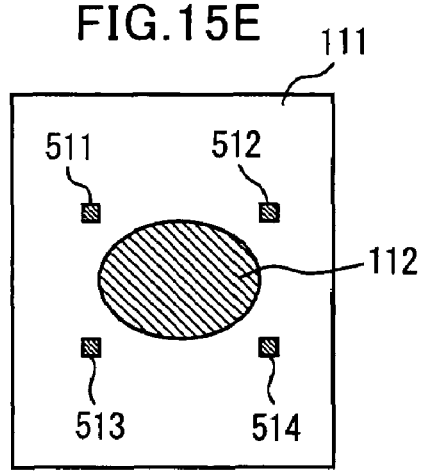
Figure 15F:
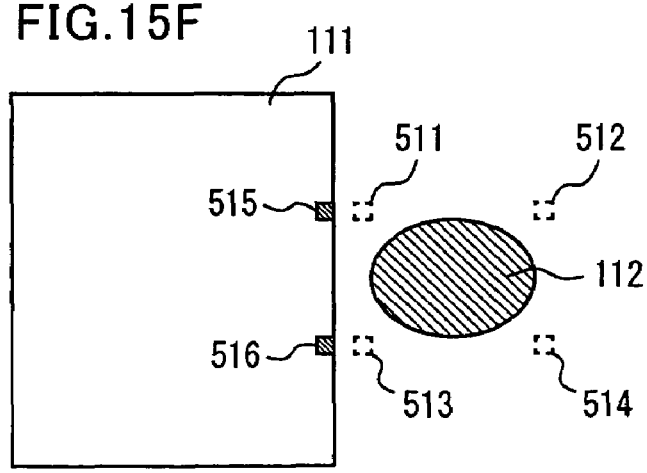

FIGS. 15E and 15F show that the color of graphic 112 is red. Referring to FIGS. 15E and 15F, feature points 511-516 are displayed in read as the color of graphic 112 is red.

It is noted that a feature point may be displayed by combining the manners of display of a feature point as illustrated in FIGS. 10, 12A-12C, 13A-13C and 15A-15F.

Figure 16A:
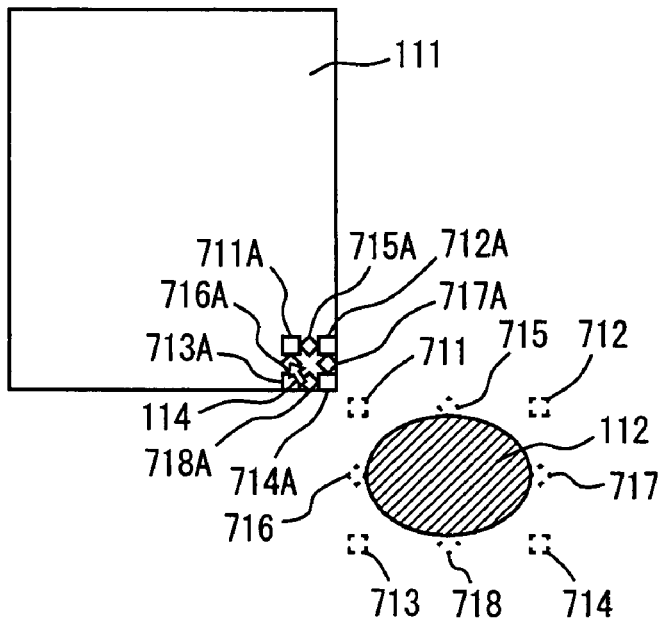
FIGS. 16A-16C are fifth views showing exemplary display images appearing on the display unit of the editing device in the embodiment.
Figure 16B:
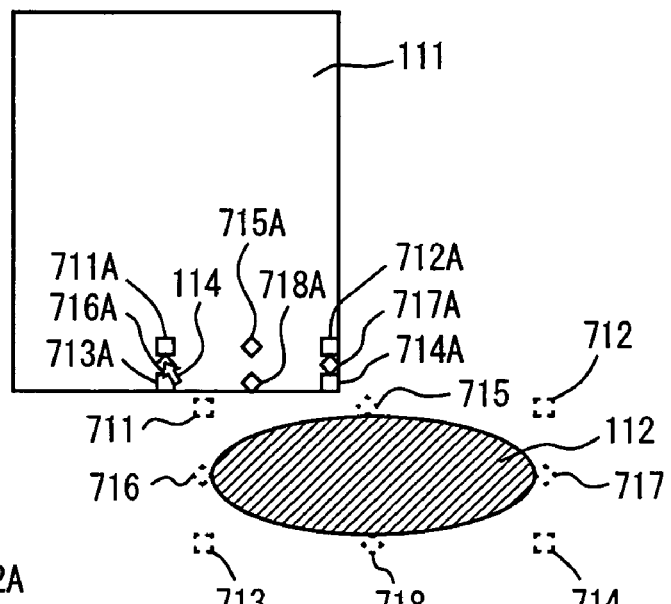
Figure 16C:
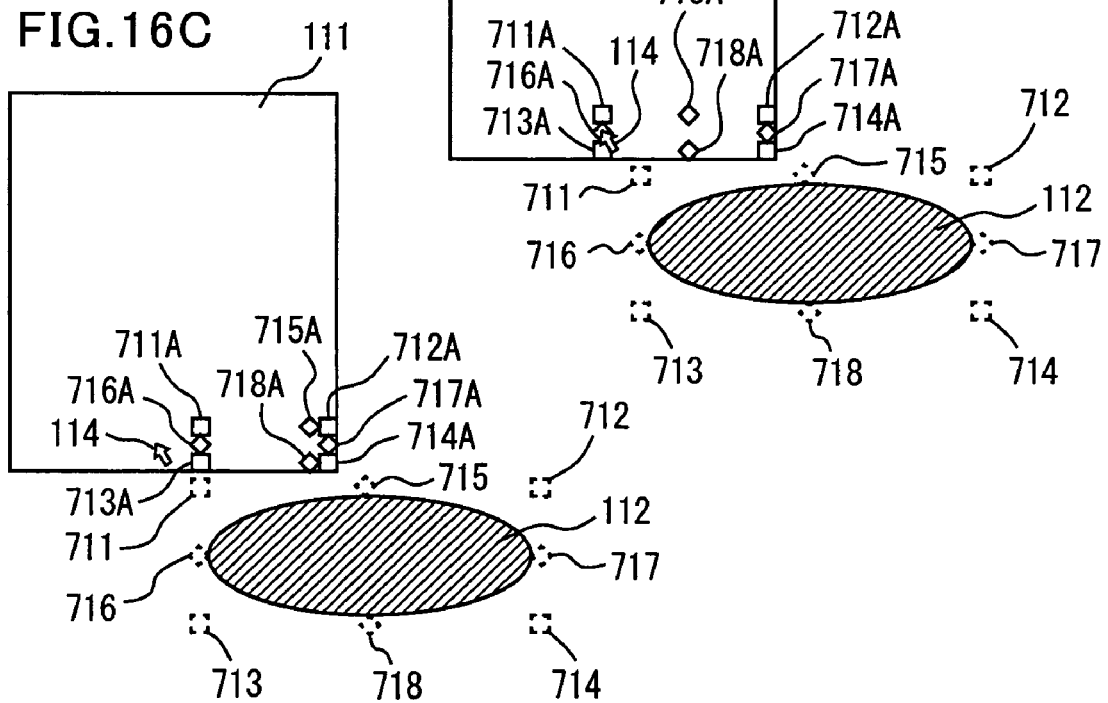

FIGS. 16A-16C show exemplary display images appearing on display unit 102 of editing device 100 in the present embodiment. FIGS. 16A-16C show that feature points 711A-718A projected into display region 111 are operated in order to operate graphic 112 outside display region 111.

FIG. 16A is an exemplary display image appearing when a feature point 716A projected into display region 111 is selected by pointer 114. Referring to FIG. 16A, pointer 114 is moved by pressing direction key 121 to be superimposed on feature point 716A. Feature point 716A is selected by pressing decide key 122. In this state, by moving pointer 114 using direction key 121, the operation on feature point 716A is obtained by operation obtaining unit 114. In this case, feature point 716A in the upper left is selected, and the selected feature point 716A is moved to the left.

FIG. 16B is an exemplary display image appearing when feature point 716A projected into display region 111 is moved while being selected by pointer 114. Referring to FIG. 16B, graphic 112 is operated by operation executing unit 115 according to the operation obtained by operation obtaining unit 114. In this case, the operation of moving feature point 716A to the left is obtained, and according to this operation, graphic 112 is enlarged to the left.

FIG. 16C is an exemplary display image appearing after feature point 716A projected into display region 111 is moved while being selected by pointer 114. Referring to FIG. 16C, feature points 711-718 are respectively projected and displayed as feature points 711A-718A, respectively, in accordance with graphic 112 operated by operation executing unit 115. In this case, in accordance with graphic 112 being enlarged to the left, feature points 711-718 are respectively projected into display region 111 and are displayed as 711A-718A, respectively.

As described above, in editing device 100 of the present embodiment, it is possible to present a position of an operation target located outside display region 111.

It is noted that although the process carried out in editing device 100 has been described in the present embodiment, an editing method for executing the process shown in FIG. 8, an editing program for causing a computer to execute the process shown in FIG. 8, and a computer-readable recording medium with the editing program recorded thereon may be embraced in the present invention.

Although the present invention has been illustrated and shown in detail, it has been shown only by way of illustration, not by way of limitation, and it should be clearly understood that the spirit and scope of the invention should be limited only by the appended claims.

The invention claimed is:

1. An editing device comprising:
   feature point detecting means detecting a position of a feature point for specifying an operation target, the feature point position lying outside a display region;
   feature point projecting means projecting said feature point into the display region as a polygon at a feature point projection position a shortest distance from the feature point position, while the feature point position remains outside the display region; and
   feature point displaying means displaying said polygon at the feature point projection position as a representation of the feature point located at the feature point position outside the display region.

2. An editing device comprising:
   a storage unit storing data for displaying an operation target and a first feature point specifying said operation target;
   a display unit having a display region displaying the operation target;
   feature point detecting means detecting a position of the first feature point of the operation target indicated by data stored by said storage unit;
   feature point projecting means projecting, when said first feature point position is outside the display region, said first feature point to a first feature point projection position as a first polygon within the display region at a shortest distance from the first feature point position; and
   feature point displaying means displaying said first polygon at said first feature point projection position as a representation of the feature point located at the first feature point position outside the display region.

3. The editing device according to claim 2, wherein said feature point displaying means displays a rectangle as said first polygon to represent said first feature point at said first feature point projection position.

4. The editing device according to any one of claims 2 to 3, wherein said storage unit stores a second feature point, said feature point detecting means detects a position of said second feature point, and said feature point projecting means projects, when said second feature point position is outside the display region, said second feature point to a second feature point projection position as a second polygon, said feature point displaying means displaying said first and second polygons in such a manner that they are not overlapped with each other, when said first feature point projection position overlaps with said second feature point projection position.

5. The editing device according to claim 4, wherein said first feature point is positioned at a first vertex of a polygon surrounding said operation target and said second feature point is positioned at a second vertex of the polygon.

6. The editing device according to claim 4, wherein
said first polygon identifies an instruction of a first operation on the operation target, and said second polygon identifies an instruction of a second operation on the operation target, and
said feature point displaying means displays said first polygon and said second polygon in manners of display different from each other.

7. The editing device according to any one of claims 2 to 3, wherein said first feature point is positioned at a center of said operation target.

8. The editing device according to any one of claims 2 to 3, further comprising:
operation obtaining means obtaining an operation on said first polygon; and
operation executing means operating said operation target according to said obtained operation.

9. The editing device according to any one of claims 2 to 3, wherein said feature point displaying means displays said first polygon in a manner of display that is varied according to a distance between said feature point position and said feature point projection position.

10. The editing device according to any one of claims 2 to 3, wherein said feature point displaying means displays said first polygon in a manner of display that is varied according to an attribute of said operation target.

11. A portable information terminal including the editing device according to claim 2.

12. An editing method causing a computer including a storage unit storing data for displaying an operation target, a display unit having a display region displaying an operation target stored by said storage unit and a feature point for specifying said operation target, and a control unit allowing said display unit to display said operation target based on data stored by said storage unit, to execute the steps of:
detecting by said computer a position of the feature point of the operation target indicated by the data stored by said storage unit, the feature point position is outside the display region;
projecting by said computer, when said feature point position is located outside said display region, said feature point to a feature point projection position as a polygon within said display region at a shortest distance from the feature point position; and
displaying by said display unit said polygon at said feature point projection position as a representation of the feature point located at the feature point position outside said display region.

13. An editing program product causing a computer including a storage unit storing data for displaying an operation target, a display unit having a display region for displaying an operation target stored by said storage unit and a feature point for specifying said operation target, and a control unit allowing said display unit to display said operation target based on data stored by said storage unit, to execute the steps of:

detecting a position of the feature point of the operation target indicated by the data stored by said storage unit, the feature point position is located outside the display region;
projecting, when said feature point position is outside the display region, the feature point to a feature point projection position as a polygon within the display region at a shortest distance from the feature point position; and
displaying said polygon at said feature point projection position as a representation of the feature point located at the feature point position outside said display region.

14. A computer-readable recording medium with an editing program recorded thereon, said editing program causing a computer including a storage unit storing data for displaying an operation target, a display unit having a display region displaying an operation target stored by said storage unit and a feature point for specifying said operation target, and a control unit allowing said display unit to display said operation target based on data stored by said storage unit, to execute the steps of:
detecting a position of the feature point of the operation target indicated by the data store by said storage unit, the feature point position is outside the display region;
projecting, when said feature point position is outside the display region, said feature point to a position within said display region as a polygon at a shortest distance from the feature point position; and
displaying said polygon at said feature point projection position as a representation of the feature point located at the feature point position outside the display region.

15. An editing device comprising:
feature point detecting means detecting a position of a feature point for specifying an operation target, the feature point position lying outside a display region;
feature point projecting means projecting the feature point into the display region as a polygon at a feature point projection position, while the feature point position remains outside the display region; and
feature point displaying means displaying said polygon at the feature point projection position as a representation of the feature point located at the feature point position outside the display region.

16. A method of editing comprising the steps of:
storing a representation of a graphic having a display size in a memory, the representation including an operation target;
providing a display region smaller than said display size;
associating a first feature point with said operation target;
displaying a portion of the representation on said display region; and
when the portion of the representation being displayed on the display region includes the first feature point, displaying the first feature point;
when the portion of the representation being displayed on the display region does not include the first feature point, displaying a projection of the first feature point on the display region as a first polygon at a position related to and spaced from the position of the first feature point, the polygon representing the first feature point.

17. The method of claim 16 wherein the first feature point has a shape and said step of displaying a projection of the first feature point as said first projected feature point on the display at a position related to the position of the first feature point comprises the step of displaying a projection of the first feature point as said first polygon having the shape of the first feature point.

18. The method of claim 16 including the additional steps of:
  associating at least one additional feature point with the operation target; and
  when the portion of the representation being displayed includes the at least one additional feature point, displaying the at least one additional feature point;
  when the portion of the representation being displayed does not include the at least one additional feature point, displaying a projection of the at least one additional feature point on the display as at least one additional polygon at a position related to and spaced from the position of the at least one additional feature point.

19. The method of claim 18 wherein said step of displaying a projection of the at least one additional feature point as said at least one additional polygon on the display at a position related to the position of the at least one additional feature point comprises the step of displaying a projection of the at least one additional feature point as said at least one additional polygon at a location different from the position of the first polygon.

20. The method of claim 16 wherein said step of displaying a projection of the first feature point as said first polygon on the display at a position related to the position of the first feature point comprises the step of displaying the projection of the first feature point in a manner related to a distance between the position of the first feature point and an edge of the display region.

* * * * *

UNITED STATES PATENT AND TRADEMARK OFFICE
CERTIFICATE OF CORRECTION

PATENT NO. : 7,612,785 B2 Page 1 of 1
APPLICATION NO. : 10/494338
DATED : November 3, 2009
INVENTOR(S) : Ueda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Nineteenth Day of October, 2010

David J. Kappos
*Director of the United States Patent and Trademark Office*